US012706394B2

(12) United States Patent
Miyashita

(10) Patent No.: US 12,706,394 B2
(45) Date of Patent: Aug. 11, 2026

(54) ANTENNA DEVICE

(71) Applicant: 1FINITY Inc., Kawasaki (JP)

(72) Inventor: Norihiro Miyashita, Yokohama (JP)

(73) Assignee: 1FINITY Inc., Kawasaki (JP)

( * ) Notice: Subject to any disclaimer, the term of this patent is extended or adjusted under 35 U.S.C. 154(b) by 25 days.

(21) Appl. No.: 18/785,047

(22) Filed: Jul. 26, 2024

(65) Prior Publication Data

US 2025/0079722 A1 Mar. 6, 2025

(30) Foreign Application Priority Data

Aug. 31, 2023 (JP) ................................ 2023-141251

(51) Int. Cl.
*H01Q 21/06* (2006.01)
*H01Q 1/50* (2006.01)

(52) U.S. Cl.
CPC ............ *H01Q 21/065* (2013.01); *H01Q 1/50* (2013.01)

(58) Field of Classification Search
CPC ...... H01Q 9/0414; H01Q 9/0485; H01Q 1/48; H01Q 21/061; H01Q 9/0457; H01Q 1/50; H01Q 21/065
See application file for complete search history.

(56) References Cited

U.S. PATENT DOCUMENTS 4,926,189 A * 5/1990 Zaghloul .............. H01Q 25/001 343/849
11,621,482 B2 * 4/2023 Yokokawa ........... H01Q 21/065 343/872
2015/0236425 A1 * 8/2015 Sudo ........................ H01Q 9/42 343/700 MS

FOREIGN PATENT DOCUMENTS

JP 9-098016 A 4/1997
JP 2000-138525 A 5/2000

* cited by examiner

*Primary Examiner* — Eva Y Montalvo
(74) *Attorney, Agent, or Firm* — Fujitsu Intellectual Property Center

(57) ABSTRACT

An antenna device includes: a first dielectric substrate that includes a first surface; a second dielectric substrate that faces the first dielectric substrate; a plurality of first radiation elements that is provided over the first surface; a power feeding unit that feeds power to the first radiation elements; a plurality of second radiation elements that is provided over a second surface of the second dielectric substrate and coupled to the plurality of first radiation elements; and through holes that are formed around the plurality of second radiation elements of the second dielectric substrate in plan view. The plurality of first radiation elements is a plurality of antenna elements for a patch antenna.

12 Claims, 27 Drawing Sheets

ANTENNA DEVICE

CROSS-REFERENCE TO RELATED APPLICATION

This application is based upon and claims the benefit of priority of the prior Japanese Patent Application No. 2023-141251, filed on Aug. 31, 2023, the entire contents of which are incorporated herein by reference.

FIELD

The embodiment discussed herein is related to an antenna device.

BACKGROUND

Heretofore, there has been a microstrip antenna including a ground conductor, a non-power feeding conductor that is disposed away from the ground conductor, a power feeding conductor that is disposed between the ground conductor and the non-power feeding conductor and to which a predetermined voltage is applied between the ground conductor and the power feeding conductor, and a wall-shaped member that is made of a dielectric material and disposed around an inter-conductor space defined by coupling a peripheral edge of the non-power feeding conductor and a peripheral edge of the power feeding conductor. The ground conductor and the power feeding conductor are provided over a first dielectric substrate, a non-power feeding conductor is provided over a second dielectric substrate, and a plurality of power feeding conductors and a plurality of non-power feeding conductors are provided in plan view and arranged in an array.

Japanese Laid-open Patent Publication No. 2000-138525 is disclosed as related art.

SUMMARY

According to an aspect of the embodiments, an antenna device includes: a first dielectric substrate that includes a first surface; a second dielectric substrate that faces the first dielectric substrate; a plurality of first radiation elements that is provided over the first surface; a power feeding unit that feeds power to the first radiation elements; a plurality of second radiation elements that is provided over a second surface of the second dielectric substrate and coupled to the plurality of first radiation elements; and through holes that are formed around the plurality of second radiation elements of the second dielectric substrate in plan view. The plurality of first radiation elements is a plurality of antenna elements for a patch antenna.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A microstrip antenna (antenna device) of related art has a configuration in which one power feeding conductor and one non-power feeding conductor overlapping each other in the up-down vertical direction form one antenna, and a plurality of antennas is arranged in an array.

By the way, in the microstrip antenna (antenna device) of related art, since the second dielectric substrate is a flat plate-shaped dielectric substrate that does not include a hole portion, mutual coupling between the plurality of antennas is strong, and a gain of the antenna device is decreased.

Accordingly, it is an object to provide an antenna device in which a gain is increased.

Hereinafter, an embodiment to which an antenna device of the present disclosure is applied will be described. In the following description, there are cases in which the same elements are denoted by the same reference signs and redundant description thereof is omitted.

The following description will be given by defining an XYZ coordinate system. A direction parallel to an X axis (X direction), a direction parallel to a Y axis (Y direction), and a direction parallel to a Z axis (Z direction) are orthogonal to each other. The X direction is an example of a first axial direction, the Y direction is an example of a second axial direction, and the Z direction is an example of a third axial direction. For convenience of description below, there are cases where the −Z direction side is referred to as lower or below, and the +Z direction side is referred to as upper or above. However, this does not represent a universal vertical relationship. Plan view refers to an XY plan view.

In the following description, there are cases in which the words row and column are used for a plurality of rows of columns extending in the X direction being arranged in the Y direction and a plurality of columns of columns extending in the Y direction being arranged in the X direction.

In the following description, there are cases in which the length, width, thickness, or the like of each constituent element is indicated in an exaggerated manner for easy understanding of configurations. Words such as parallel, perpendicular, orthogonal, horizontal, vertical, and up-down allow deviation to the extent that the effect of the embodiment is not impaired.

Embodiment

Figure 1A:
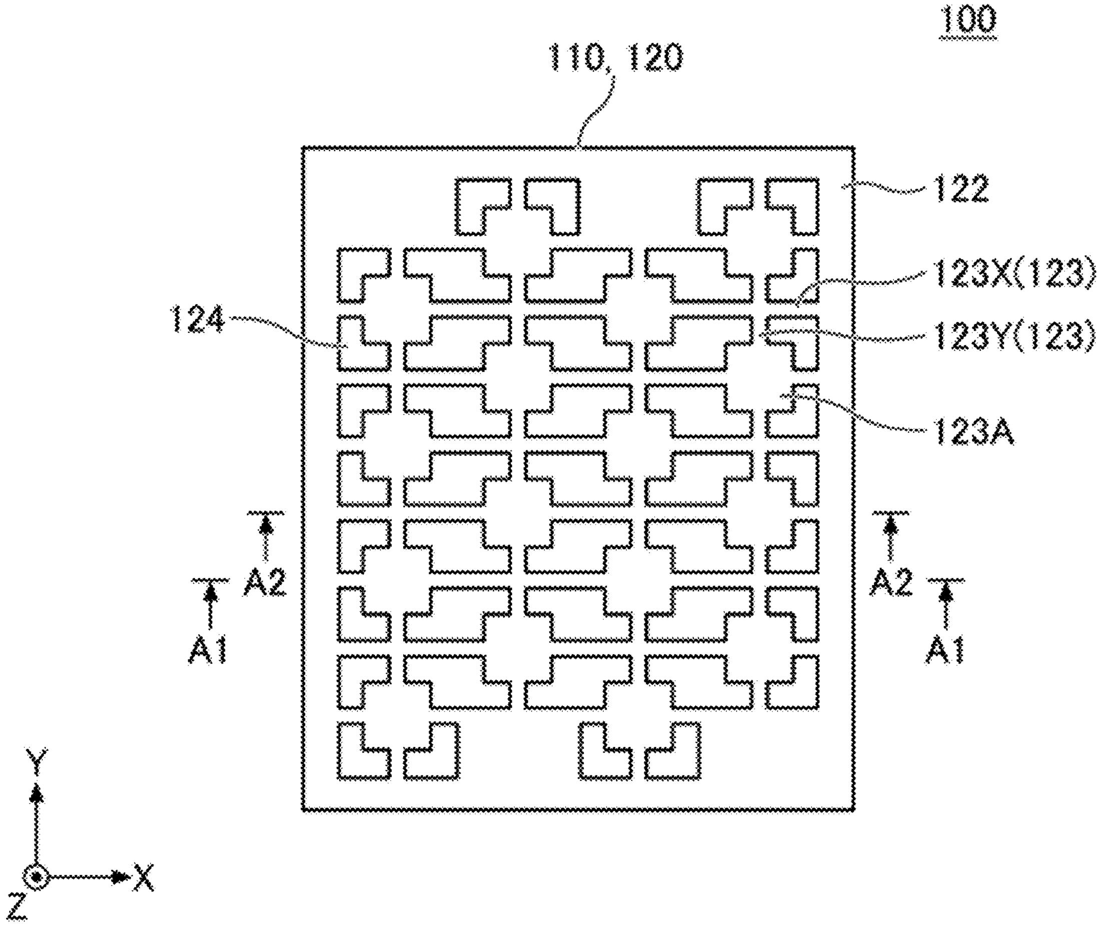
FIG. 1A is a diagram illustrating an example of a configuration of an antenna device of an embodiment.
Figure 1B:
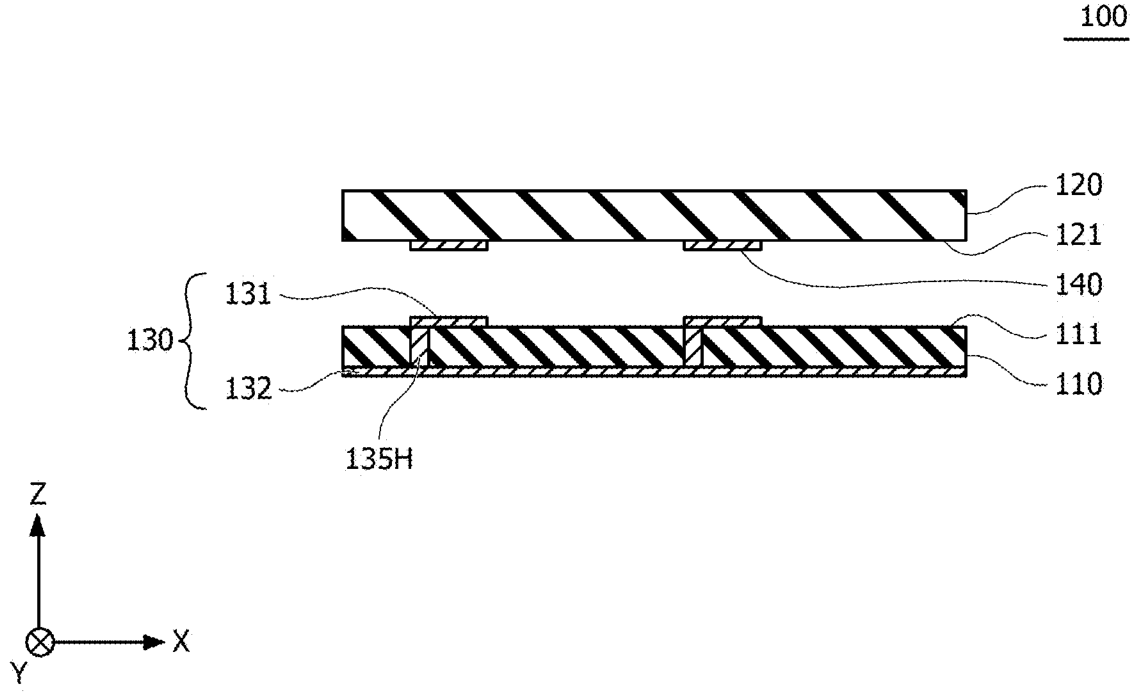
FIG. 1B is a diagram illustrating an example of a configuration of a cross section viewed from A1-A1 arrows in FIG. 1A.
Figure 1C:
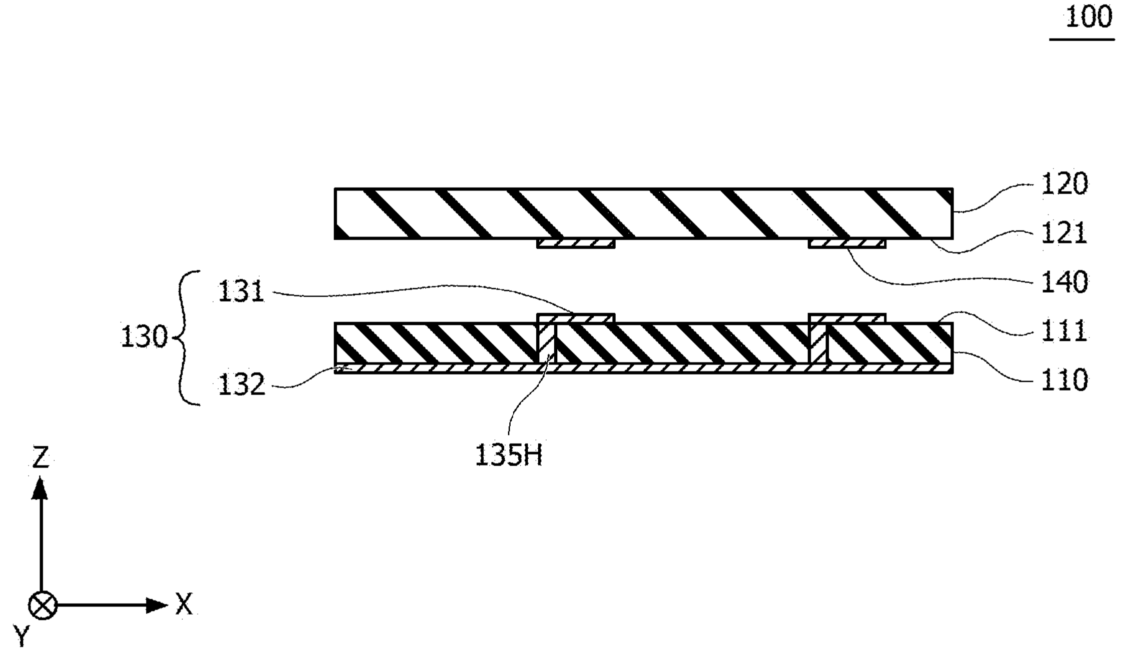
FIG. 1C is a diagram illustrating an example of a configuration of a cross section viewed from A2-A2 arrows in FIG. 1A.

FIG. 1A is a diagram illustrating an example of a configuration of an antenna device 100 of the embodiment. FIG. 1B is a diagram illustrating an example of a configuration of a cross section viewed from A1-A1 arrows in FIG. 1A. FIG. 1C is a diagram illustrating an example of a configuration of a cross section viewed from A2-A2 arrows in FIG. 1A.

<Configuration of Antenna Device 100>

The antenna device 100 includes a substrate 110, a substrate 120, a patch antenna 130, and a plurality of second antenna elements 140. The substrate 110 is an example of a first dielectric substrate, and the substrate 120 is an example of a second dielectric substrate. The second antenna element 140 is an example of a second radiation element. Although a form in which the number of second antenna elements 140 is 16 will be described below as an example, it is sufficient that there is a plurality of second antenna elements 140, and the number of second antenna elements 140 may be any number.

The patch antenna 130 includes a plurality of first antenna elements 131 and one ground layer 132. The plurality of first antenna elements 131 is an example of a plurality of first radiation elements, and is an example of a plurality of antenna elements for a patch antenna. Each first antenna element 131 constructs a patch antenna together with the ground layer 132. One ground layer 132 is a common ground layer corresponding to each of the plurality of antenna elements for the patch antenna. The patch antenna 130 is a set of a plurality of patch antennas corresponding to the plurality of first antenna elements 131. The number of first antenna elements 131 is equal to the number of second antenna elements 140. Each pair of the first antenna element 131 and the second antenna element 140 overlapping each other in the up-down direction constructs one antenna. As an example, the antenna device 100 has a configuration including 16 antennas. As an example, such a plurality of antennas may be used for beamforming.

The antenna device 100 has a configuration in which an upper surface 111 of the substrate 110 and a lower surface 121 of the substrate 120 are disposed to face each other. The surface 111 is an example of a first surface, and the surface 121 is an example of a second surface. The patch antenna 130 is provided over the substrate 110. For example, the plurality of first antenna elements 131 is provided over the surface 111 of the substrate 110, and the ground layer 132 is provided over the lower surface of the substrate 110. The second antenna elements 140 are provided over the surface 121 of the substrate 120. The substrate 110 and the substrate 120 are fixed by a housing, a holder, or the like (not illustrated).

Figure 2A:
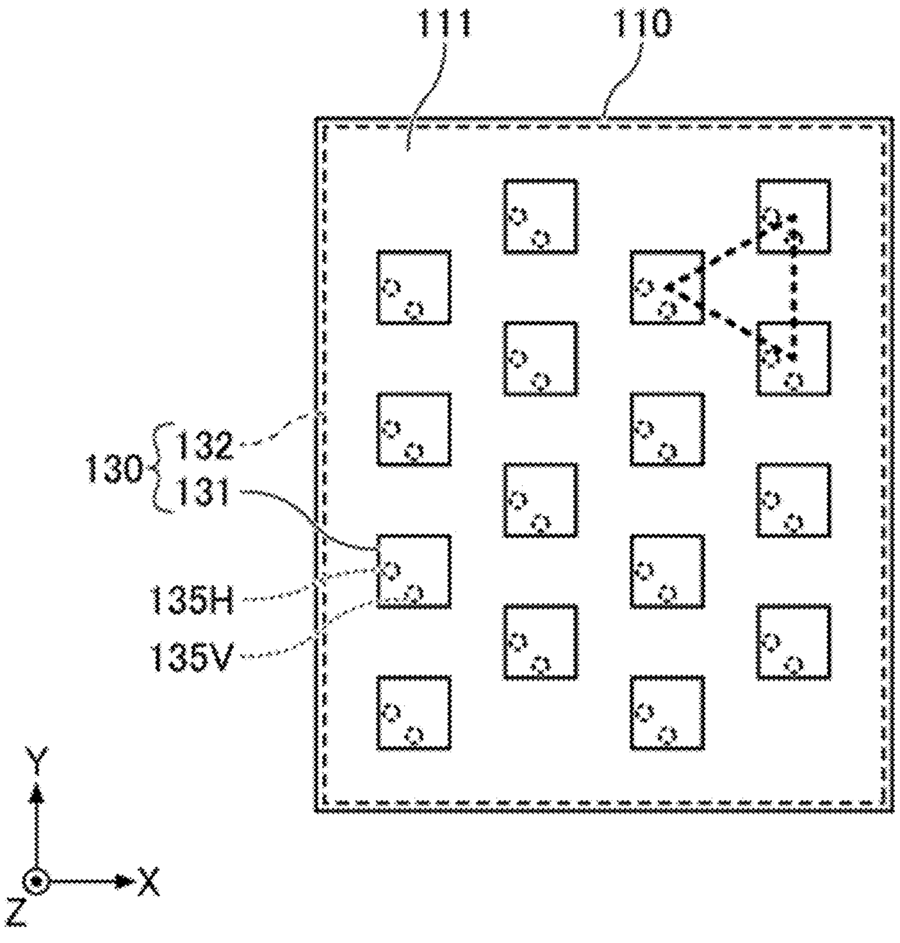
FIG. 2A is a diagram illustrating an example of a planar configuration of a substrate and a patch antenna.
Figure 2B:
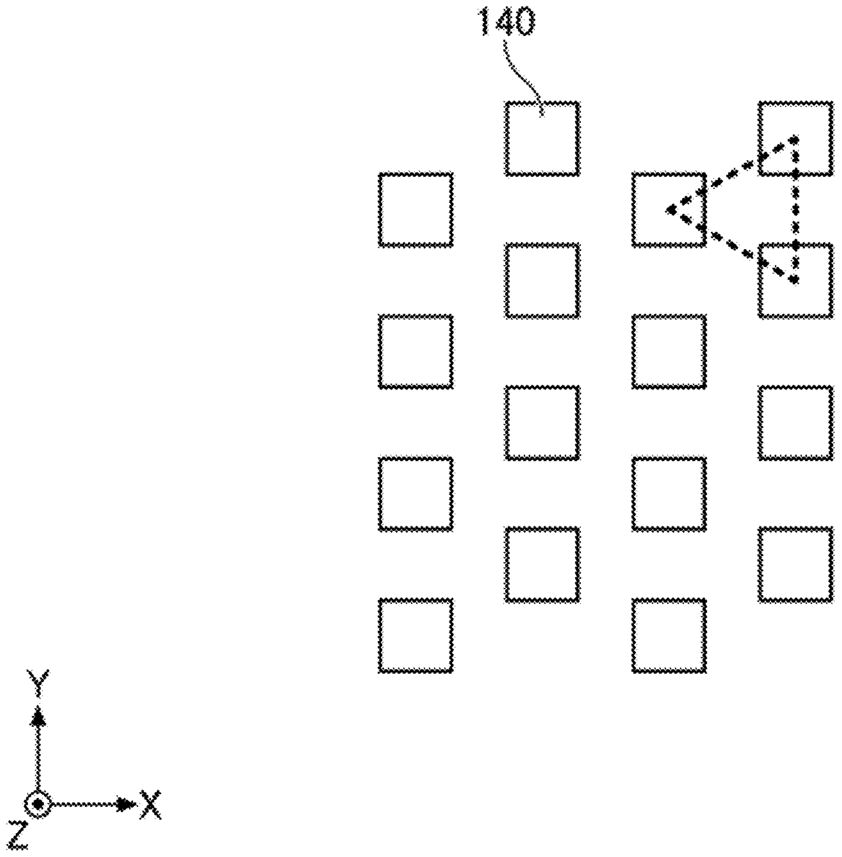
FIG. 2B is a diagram illustrating an example of a configuration of a plurality of second antenna elements.
Figure 2C:
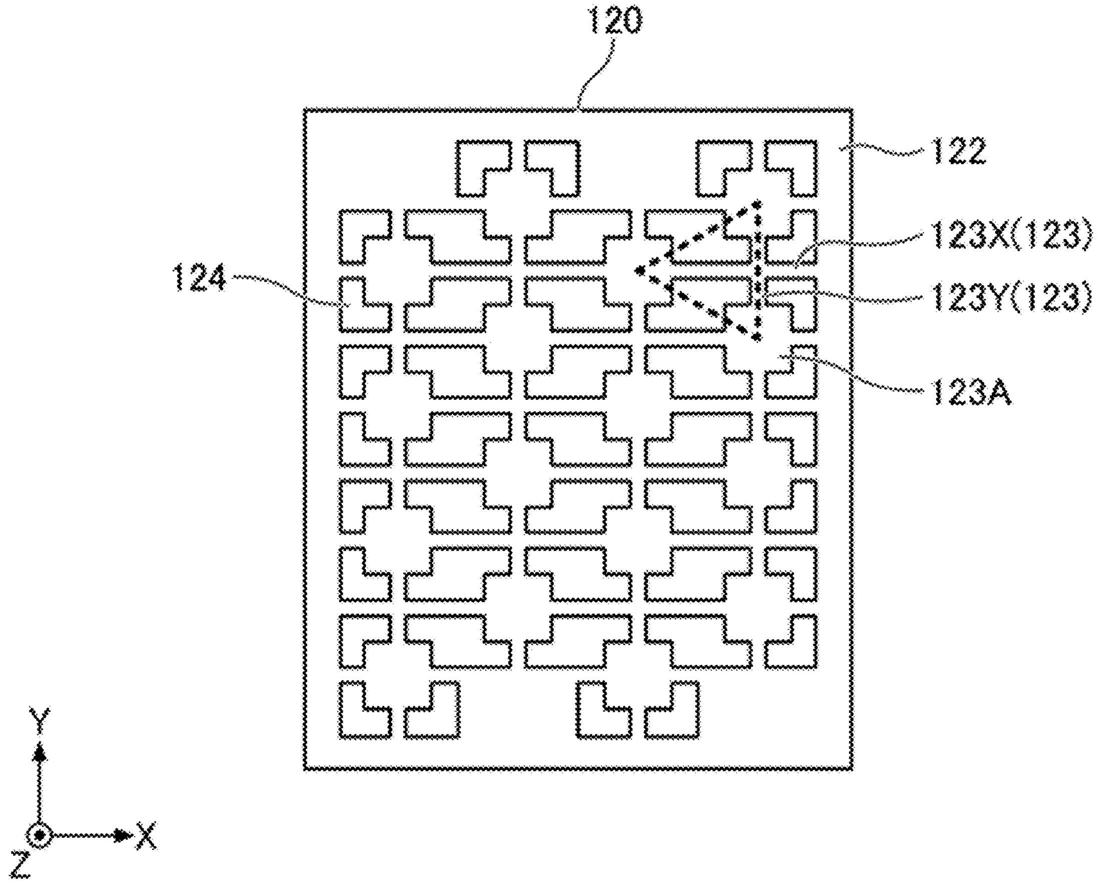
FIG. 2C is a diagram illustrating an example of a configuration of a substrate.

A configuration of the antenna device 100 will be described with reference to FIG. 2A to FIG. 2C in addition to FIG. 1A to FIG. 1C. FIG. 2A is a diagram illustrating an example of a planar configuration of the substrate 110 and the patch antenna 130. FIG. 2B is a diagram illustrating an example of a configuration of the plurality of second antenna elements 140. Although the plurality of second antenna elements 140 is provided over the lower surface 121 of the substrate 120, only the plurality of second antenna elements 140 is illustrated in the XY plane in FIG. 2B. FIG. 2C is a diagram illustrating an example of a configuration of the substrate 120.

As an example, a form will be described below in which the operating frequency band of the antenna device 100 is the 28 GHz band. The operating frequency band of the antenna device 100 is not limited to the 28 GHz band. As an example, the operating frequency band is a millimeter wave band or a frequency band belonging to a frequency band included in Sub-6. The millimeter wave band includes a quasi-millimeter wave band of 24 GHz to 30 GHz in addition to the frequency bandwidth of 30 GHz to 300 GHz.

<Substrate 110>

The substrate 110 is a flat plate-shaped substrate extending parallel to the XY plane. As an example, the substrate 110 is a wiring substrate made of an epoxy resin or the like. As an example of the size of the substrate 110, the length in the X direction is 24 mm, the length in the Y direction is 30 mm, and the thickness in the Z direction is 0.26 mm.

The plurality of first antenna elements 131 is provided over the upper surface 111 of the substrate 110, and the ground layer 132 is provided over the lower surface of the substrate 110. Through holes that penetrate the substrate 110 in the Z direction are formed in the substrate 110 at positions corresponding to two power feeding points (an example of a power feeding unit) of the first antenna element 131, and vias 135H and 135V are formed in the through holes. Positions of the vias 135H and 135V will be described later.

<Substrate 120>

The substrate 120 is a flat plate-shaped substrate extending parallel to the XY plane, and includes the lower surface 121, a frame portion 122, beam portions 123X, beam portions 123Y, and through holes 124. As an example, the substrate 120 is a wiring substrate made of an epoxy resin, polytetrafluoroethylene (PTFE), polyphenylene ether (PPE), low-temperature co-fired ceramic (LTCC), or the like, similarly to the substrate 110. As an example of the size of the substrate 120, the length in the X direction is 24 mm, the length in the Y direction is 30 mm, and the thickness in the Z direction is 0.47 mm. As an example, the size of the substrate 120 in plan view is equal to the size of the substrate 110 in plan view.

The frame portion 122 is a portion as a frame along the outer edge of the substrate 120 in plan view, and is coupled to the end portions of the beam portions 123X and 123Y on the outer edge side. As seen in plan view, the beam portions 123X, the beam portions 123Y, and the through holes 124 are positioned inside the frame portion 122. Hereinafter, in a case where the beam portions 123X and 123Y are not distinguished from each other, the beam portions are simply referred to as beam portions 123. The beam portions 123X and 123Y include holding portions 123A wider than the other portions of the beam portions 123X and 123Y in plan view.

The beam portions 123X are beam-shaped portions extending in the X direction between the through holes 124 adjacent to each other in the Y direction. The beam portions 123Y are beam-shaped portions extending in the Y direction between the through holes 124 adjacent to each other in the X direction. The beam portions 123X and 123Y intersect at a plurality of portions in plan view.

The holding portion 123A is a portion where the second antenna element 140 is formed over the lower surface 121, and is provided for holding the second antenna element 140. As an example, the holding portion 123A has a square shape in plan view, and is a portion wider than the other portions of the beam portions 123X and 123Y. The size of the holding portion 123A in plan view is substantially equal to the size of the second antenna element 140 in plan view.

The holding portions 123A are provided in approximately half of the portions where the beam portions 123X and 123Y intersect in plan view. For example, the holding portions 123A are arranged alternately at a plurality of portions where the beam portions 123X and 123Y intersect in the X direction, and are arranged alternately at a plurality of portions where the beam portions 123X and 123Y intersect in the Y direction.

Since the number of holding portions 123A is equal to the number of second antenna elements 140, as an example, the antenna device 100 includes 16 holding portions 123A as illustrated in FIG. 2C. The 16 holding portions 123A are arranged in four columns in the X direction, and four holding portions 123A are arranged in each column in the Y direction.

The positions of the four holding portions 123A in the first column from the −X direction side in the Y direction are equal to the positions of the four holding portions 123A in the third column from the −X direction side in the Y direction. The positions of the four holding portions 123A in the second column from the −X direction side in the Y direction are equal to the positions of the four holding portions 123A in the fourth column from the −X direction side in the Y direction. As an example, the intervals (pitches) between the four holding portions 123A in the Y direction in each column are equal.

The positions of the four holding portions 123A in the first and third columns from the −X direction side in the Y direction and the positions of the four holding portions 123A in the second and fourth columns from the −X direction side in the Y direction are shifted by half of the pitch between the holding portions 123A in the Y direction.

The four holding portions 123A in the first and third columns from the −X direction side and the four holding portions 123A in the second and fourth columns from the −X direction side are arranged such that the interval between the holding portions 123A adjacent to each other in a direction of 30 degrees with respect to the X axis and Y axis in plan view is equal to the pitch between the holding portions 123A in the Y direction.

For this reason, as illustrated in FIG. 2C, in the antenna device 100, the holding portions are arranged such that the centers of three holding portions 123A closest to each other in a two dimensional arrangement in plan view are positioned at the vertices of an equilateral triangle. The length of one side of the equilateral triangle is equal to the pitch between the holding portions 123A in the Y direction.

The through holes 124 are formed in portions excluding the beam portions 123X and the beam portions 123Y inside the frame portion 122 in plan view. The holding portions 123A are a part of the beam portions 123X and the beam portions 123Y. For example, the portions remaining after the plurality of through holes 124 is formed in the flat plate-shaped substrate 120 are the frame portion 122, the beam portions 123X, and the beam portions 123Y.

<Patch Antenna 130>

The patch antenna 130 includes the plurality of first antenna elements 131 and one ground layer 132. As illustrated in FIG. 2A, the plurality of first antenna elements 131 is formed over the upper surface 111 of the substrate 110. The ground layer 132 is formed over substantially the entire lower surface of the substrate 110.

As described above, since each first antenna element 131 constitutes a patch antenna together with the ground layer 132, and one ground layer 132 is a common ground layer corresponding to each first antenna element 131, the patch antenna 130 is a set of a plurality of patch antennas.

As an example, the shape of the first antenna element 131 in plan view is a square. Although a form in which the first antenna element 131 is a square in plan view will be described, the first antenna element 131 may be circular in plan view. The lengths of the first antenna element 131 in the X direction and the Y direction may be set to appropriate lengths in relation to a wavelength at an operation frequency of the antenna device 100 in consideration of a wavelength shortening rate due to a relative permittivity or the like of the substrate 110.

As an example, the shape and size of the first antenna element 131 in plan view and the shape and size of the second antenna element 140 in plan view are different from each other, but they may be equal to each other. A wider bandwidth of the antenna device 100 may be achieved by the shapes or sizes of the first antenna element 131 and the second antenna element 140 being different in plan view. As an example, a form will be described in which the shapes of the first antenna element 131 and the second antenna element 140 are both a square, and the size of the second antenna element 140 is larger than the size of the first antenna element 131. The number of first antenna elements 131 is equal to the number of second antenna elements 140. The positions of the plurality of first antenna elements 131 are equal to the positions of the plurality of second antenna elements 140.

As described above, since the positions of the plurality of second antenna elements 140 are equal to the positions of the plurality of holding portions 123A, the positions of the plurality of first antenna elements 131 are equal to the positions of the plurality of holding portions 123A in plan view.

For this reason, as illustrated in FIG. 2A, the plurality of first antenna elements 131 is arranged such that the centers of three first antenna elements 131 closest to each other in a two dimensional arrangement in plan view are positioned at the vertices of an equilateral triangle. The length of one side of the equilateral triangle is equal to the pitch between the holding portions 123A in the Y direction. For example, the pitch between the centers of three first antenna elements 131 closest to each other in a two dimensional arrangement in plan view is equal to the pitch between the holding portions 123A in the Y direction.

The vias 135H and 135V for power feeding are coupled to each first antenna element 131. Since the vias 135H and 135V are positioned at the lower side of the first antenna element 131, the positions of the vias 135H and 135V in plan view are indicated by broken lines in FIG. 2A. The two points at which the vias 135H and 135V are coupled to the first antenna element 131 are power feeding points.

As an example, the via 135H is positioned immediately below the center in the Y direction of the end portion on the −X direction side of the first antenna element 131 in plan view. As an example, the via 135V is positioned immediately below the center in the X direction of the end portion on the −Y direction side of the first antenna element 131 in plan view.

As an example, when the antenna device 100 is used, the direction of the antenna device 100 is defined such that the XZ plane is parallel to the horizontal plane. The power feeding point at which the via 135H is coupled to the first antenna element 131 is a power feeding point at which a signal for horizontal polarization is fed. The power feeding point at which the via 135V is coupled to the first antenna element 131 is a power feeding point at which a signal for vertical polarization is fed.

When power is fed through the via 135H, the first antenna element 131 is excited in the X direction and radiates a horizontally polarized radio wave. When power is fed through the via 135V, the first antenna element 131 is excited in the Y direction and radiates a vertically polarized radio wave.

By feeding power to the first antenna element 131 at the two power feeding points, the patch antenna 130 radiates a horizontally polarized radio wave and a vertically polarized radio wave in the +Z direction. Although a form in which the first antenna element 131 radiates horizontally polarized and vertically polarized radio waves will be described as an example, the radio wave radiated by the first antenna element 131 may be either one of horizontally polarized and vertically polarized radio waves, or may be a radio wave of polarization other than horizontal polarization and vertical polarization. As an example, polarization other than horizontal polarization and vertical polarization may be polarization of ±45 degrees.

As an example, the via 135H may be positioned immediately below the center in the Y direction of the end portion on the +X direction side of the first antenna element 131 in plan view. As an example, the via 135V may be positioned immediately below the center in the X direction of the end portion on the +Y direction side of the first antenna element 131 in plan view.

The shape and/or size of the first antenna element 131 in plan view do not have to be equal to the shape and/or size of the second antenna element 140 in plan view.

Although a configuration in which power is fed to the first antenna element 131 through the via 135H or the via 135V has been described above, power feeding through a microstrip line, power feeding using a probe, power feeding using an L-shaped probe bent in an L shape, or power feeding using a slot power feeding unit may be performed. A power feeding line extending over the upper surface 111 of the substrate 110 may be provided.

An amplifier or the like may be inserted in series into the power feeding line extending over the upper surface 111 of the substrate 110. Such amplifier may be disposed over the upper surface 111 of the substrate 110. By disposing the amplifier over the upper surface 111 of the substrate 110, heat generated by the amplifier may be efficiently dissipated through the through holes 124. For example, heat dissipation efficiency may be further increased by disposing the amplifier immediately below the through holes 124.

Such amplifier may be disposed over the first antenna elements 131. Heat generated by the amplifier may be efficiently dissipated through the through holes 124, and, for example, heat dissipation efficiency may be further increased by disposing the amplifier immediately below the through holes 124.

<Second Antenna Element 140>

The second antenna element 140 is formed over the lower surface 121 of the substrate 120. For example, the second antenna element 140 is formed over the lower surface of the holding portion 123A in the surface 121. Although a configuration in which the second antenna element 140 is formed over the lower surface of the holding portion 123A will be described, the second antenna element may be formed over the upper surface of the holding portion 123A. One second antenna element 140 may be formed over each of the lower surface and upper surface of the holding portion 123A.

For example, the plurality of second antenna elements 140 is arranged along the X direction and the Y direction in plan view, and the beam portions 123X and 123Y extend along the X direction and the Y direction in plan view.

As an example, the second antenna element 140 is a square in plan view, and has a size in plan view equal to the size of the first antenna element 131 in plan view. The number of second antenna elements 140 is equal to the number of first antenna elements 131, and the positions of the plurality of second antenna elements 140 in plan view are equal to the positions of the plurality of first antenna elements 131 in plan view.

Unlike the first antenna element 131, the second antenna element 140 does not include power feeding points.1 Each second antenna element 140 is electromagnetically coupled mainly to the first antenna element 131 positioned immediately below the second antenna element 140. For example, each second antenna element 140 is fed with power and excited mainly by a radio wave radiated in the +Z direction by the first antenna element 131 positioned immediately below the second antenna element 140. The word mainly is used because, while each second antenna element 140 is also electromagnetically coupled to the first antenna elements 131 other than the first antenna element 131 positioned immediately below the second antenna element 140, since the first antenna element 131 positioned immediately below is the closest, the electromagnetic coupling with the first antenna element 131 positioned immediately below is dominant. The second antenna element 140 radiates a radio wave in the +Z direction by being fed with power and excited by the radio wave radiated from the first antenna element 131.

When the first antenna element 131 is fed with power through the via 135H and is excited in the X direction, the second antenna element 140 is excited in the X direction and radiates a horizontally polarized radio wave. When the first antenna element 131 is fed with power through the via 135V and is excited in the Y direction, the second antenna element 140 is excited in the Y direction and radiates a vertically polarized radio wave. For example, the X direction and the Y direction are directions perpendicular to the excitation direction of the electric field of the plurality of second antenna elements 140 in plan view.

The positions of the plurality of second antenna elements 140 are equal to the positions of the plurality of holding portions 123A and the positions of the plurality of first antenna elements 131. For this reason, as illustrated in FIG. 2B, the plurality of second antenna elements 140 is arranged such that the centers of three second antenna elements 140 closest to each other in a two dimensional arrangement in plan view are positioned at the vertices of an equilateral triangle. The length of one side of the equilateral triangle is equal to the pitch between the holding portions 123A in the Y direction. For example, the pitch between the centers of three second antenna elements 140 closest to each other in a two dimensional arrangement in plan view is equal to the pitch between the holding portions 123A in the Y direction.

As described above, since the pitch between the second antenna elements 140 may be expanded while suppressing expansion of the interval between the second antenna elements 140 in the X direction and the Y direction to the minimum by arranging three second antenna elements 140 closest to each other in a two dimensional arrangement so as to be positioned at the vertices of an equilateral triangle in plan view, mutual coupling between antennas constructed by the first antenna elements 131 and the second antenna elements 140 may be reduced.

By setting the pitches between the centers of three first antenna elements 131 and three second antenna elements 140 closest to each other in a two dimensional arrangement in plan view to be equal to each other, mutual coupling between antennas constructed by the first antenna elements 131 and the second antenna elements 140 may be equalized.

In plan view, the beam portions 123X and 123Y pass through the centers of the widths (lengths) of the second antenna elements 140 in the X direction and the Y direction. For example, the beam portions 123X and 123Y extend over a straight line coupling the centers of the plurality of second antenna elements 140 in the X direction and the Y direction in plan view.

When the second antenna element 140 is excited in the X direction, the electric field at the center of the width of the second antenna element 140 in the X direction is smallest. Likewise, when the second antenna element 140 is excited in the Y direction, the electric field at the center of the width of the second antenna element 140 in the Y direction is smallest.

The beam portions 123X and 123Y having a relative permittivity higher than that of air present in the through holes 124 pass through the positions where the electric field is smallest when the second antenna element 140 is excited as described above. This contributes to reduction of mutual coupling between antennas constructed by the first antenna element 131 and the second antenna element 140 which overlap each other in the up-down direction. For example, by making the beam portions 123X and 123Y pass through the center of the width of the second antenna element 140 in the X direction and the Y direction for the second antenna element 140 excited in the X direction and the Y direction, mutual coupling between antennas constructed by the first antenna element 131 and the second antenna element 140 which overlap each other in the up-down direction may be reduced.

The antenna device 100 may have a configuration including one of the via 135H for horizontal polarization and the via 135V for vertical polarization.

<Simulation Result>

Figure 3A:
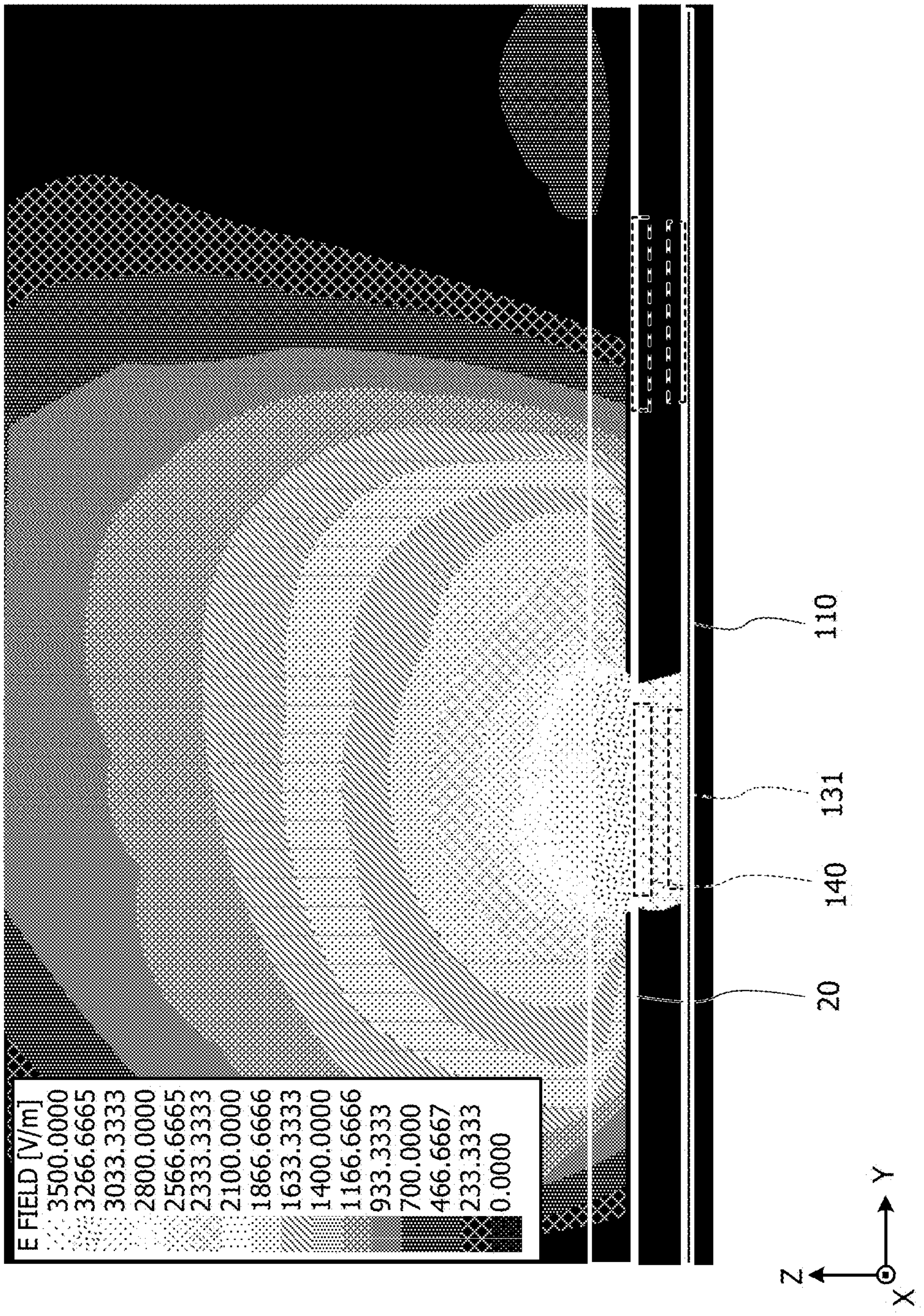
FIG. 3A is a diagram illustrating a simulation result of an antenna device for comparison.

FIG. 3A is a diagram illustrating a simulation result of an antenna device for comparison. The antenna device for comparison includes, instead of the substrate 120, a substrate 20 that does not include the through holes 124. The substrate 110, two adjacent first antenna elements 131, the via 135H, the substrate 20, and two adjacent second antenna elements 140 are illustrated in FIG. 3A. For example, FIG. 3A illustrates a simulation result in a state where there are two antennas constructed by the first antenna elements 131 and the second antenna elements 140. The two antennas are adjacent to each other.

Figure 3B:
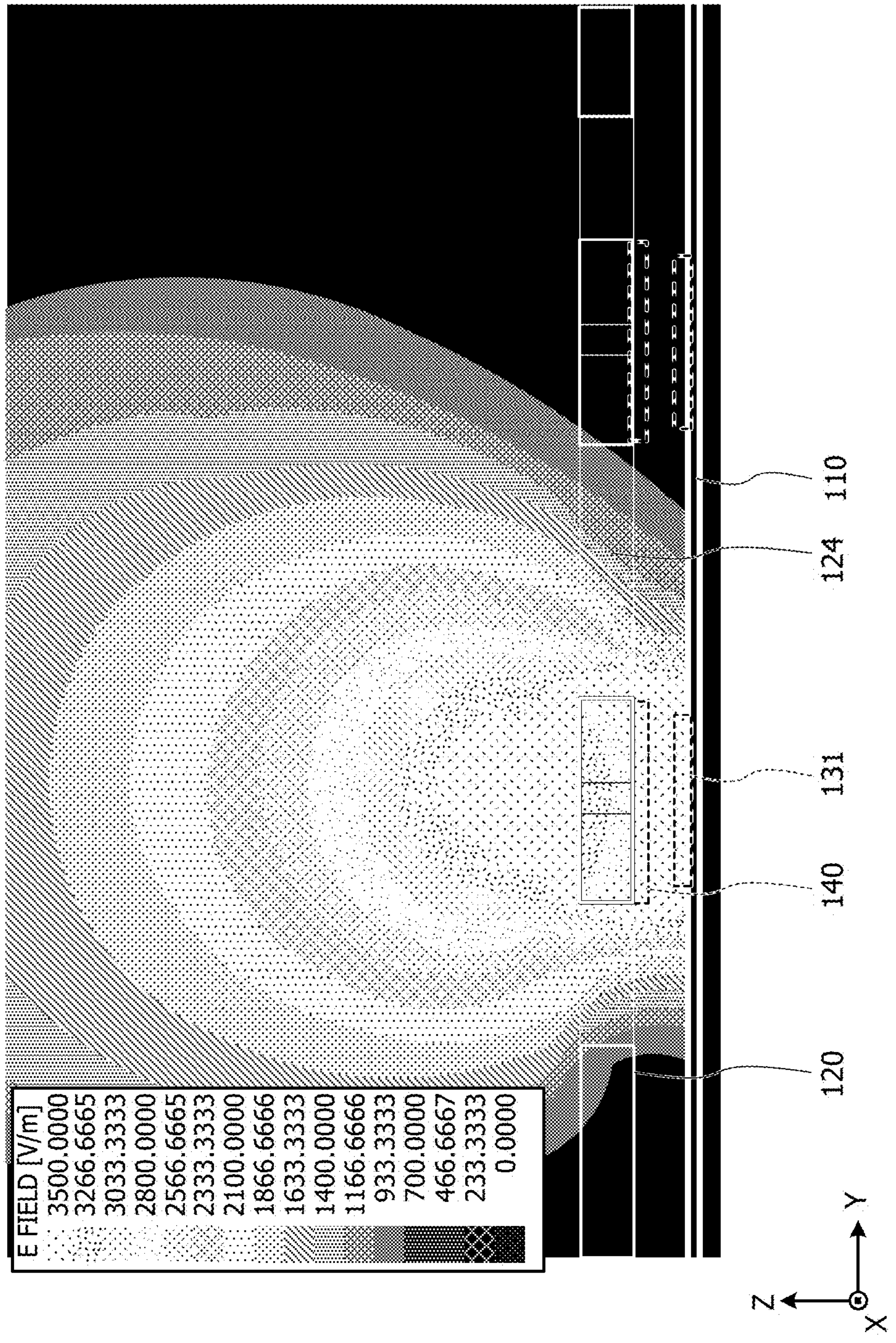
FIG. 3B is a diagram illustrating a simulation result of the antenna device of the embodiment.

FIG. 3B is a diagram illustrating a simulation result of the antenna device 100 of the embodiment. The substrate 110, two adjacent first antenna elements 131, the via 135H, the substrate 120, and two adjacent second antenna elements 140 are illustrated in FIG. 3B. Two through holes 124 and one beam portion 123X are present between the two adjacent second antenna elements 140. For example, as with FIG. 3A, FIG. 3B illustrates a simulation result in a state where there are two antennas constructed by the first antenna elements 131 and the second antenna elements 140. The two antennas are adjacent to each other.

As an example, FIGS. 3A and 3B illustrate calculation results of an electric field distribution in a cross section parallel to the YZ plane. In the simulation, power is fed only to the via 135H for horizontal polarization of the first antenna element 131 on the left side, and power is not fed to the first antenna element 131 on the right side. An electric field distribution to be obtained under such conditions was confirmed.

As illustrated in FIG. 3A, it may be seen that, in the two antennas of the antenna device for comparison, an electric field is propagated in the right direction from the left antenna (the first antenna element 131 and the second antenna element 140) to the right antenna (the first antenna element 131 and the second antenna element 140). It may be seen that coupling between the two adjacent antennas is strong.

By contrast, as illustrated in FIG. 3B, it may be seen that, in the two antennas of the antenna device 100 of the embodiment, an electric field propagating in the right direction from the left antenna (the first antenna element 131 and the second antenna element 140) to the right antenna (the first antenna element 131 and the second antenna element 140) is reduced as compared with FIG. 3A. In FIG. 3B, an electric field propagating in the upward direction from the second antenna element 140 is increased as compared with FIG. 3A. It is considered that the electric field has leaked in the +Z direction since there are through holes 124 around the second antenna element 140.

From the above results, it has been found that, by providing the through holes 124 in the substrate 120, the antenna device 100 of the embodiment may reduce mutual coupling between antennas constructed by the first antenna element 131 and the second antenna element 140 which overlap each other in the up-down direction. By reducing mutual coupling between antennas constructed by the first antenna element 131 and the second antenna element 140 which overlap each other in the up-down direction, a gain of the antenna device 100 may be increased. It has been found that the antenna device 100 of the embodiment may reduce mutual coupling between adjacent antennas and increase a gain by causing an electric field to leak in the +Z direction and reducing electric fields leaking in the X direction and the Y direction by providing the through holes 124 in the substrate 120.

<Effect>

The antenna device 100 includes the substrate 110 (first dielectric substrate) including the surface 111, the substrate 120 (second dielectric substrate) facing the substrate 110, a plurality of first radiation elements provided over the surface 111, the power feeding unit feeding power to the first radiation element, a plurality of second antenna elements 140 provided over the surface 121 of the substrate 120 and coupled to the plurality of first radiation elements, and the through holes 124 formed around the plurality of second antenna elements 140 of the substrate 120 in plan view, where the plurality of first radiation elements is the plurality of first antenna elements 131 for a patch antenna. As described above, in the antenna device 100, since the through holes 124 are provided around the second antenna element 140 in plan view, the effective relative permittivity of the constituent elements around the second antenna element 140 may be reduced. For this reason, mutual coupling between antennas constructed by the first antenna element 131 and the second antenna element 140 which overlap each other in the up-down direction may be reduced, and a gain of the antenna device 100 may be increased. As described above, in the antenna device 100, since the through holes 124 are provided around the second antenna element 140 in plan view, an electric field leaking in the +Z direction increases and electric fields leaking in the X direction and the Y direction are reduced, thereby reducing mutual coupling between adjacent antennas and increasing a gain. Weight reduction of antennas may be achieved by providing the through holes 124 in the substrate 120.

Therefore, the antenna device 100 in which a gain is increased may be provided.

The power feeding unit may be a slot power feeding unit that feeds power away from the first radiation element, a power feeding line that feeds power away from the first radiation element, an L-shaped probe that feeds power away from the first radiation element, or a probe that is coupled to the first radiation element and feeds power. Power may be fed by various power feeding units. Specific configurations of these power feeding units will be described later.

The plurality of first radiation elements is the plurality of first antenna elements 131 for a patch antenna, and the plurality of second antenna elements 140 may be disposed respectively at positions overlapping the plurality of first antenna elements 131 in plan view. For this reason, the antenna device 100 may be provided in which each second antenna element 140 is electromagnetically coupled to each first antenna element 131, power may be efficiently fed to the second antenna element 140 by a radio wave radiated from the first antenna element 131, and a gain is further increased.

The shape of the plurality of second antenna elements 140 in plan view may be equal to the shape of the plurality of first antenna elements 131 in plan view. For this reason, the antenna device 100 may be provided in which each second antenna element 140 is electromagnetically coupled to each first antenna element 131 in a better state, power may be efficiently fed to the second antenna element 140 by a radio wave radiated from the first antenna element 131, and a gain is further increased.

The substrate 120 includes the plurality of through holes 124, and may include the plurality of beam portions 123X and 123Y that extends between the plurality of through holes 124 in plan view and holds the plurality of second antenna elements 140. By holding the plurality of second antenna elements 140 by the plurality of beam portions 123X and 123Y, the antenna device 100 may be provided in which the plurality of second antenna elements 140 may be stably held and a gain is increased.

The beam portions 123 include the plurality of holding portions 123A wider than the other portions of the beam portions 123, and the plurality of second antenna elements 140 may be held respectively by the plurality of holding portions 123A. By holding the plurality of second antenna elements 140 by the plurality of widened holding portions 123A, the antenna device 100 may be provided in which the plurality of second antenna elements 140 may be more stably held and a gain is increased.

The plurality of second antenna elements 140 is arranged along the X direction (first axial direction) and the Y direction (second axial direction) in plan view, and the plurality of beam portions 123 may extend along the X direction (first axial direction) or the Y direction (second axial direction) in plan view. By making the directions in which the plurality of second antenna elements 140 is arranged and the directions in which the plurality of beam portions 123X and 123Y extends equal to each other, a configuration may be achieved in which mutual coupling between antennas constructed by the first antenna element 131 and the second antenna element 140 which overlap each other in the up-down direction is easily reduced.

The X direction (first axial direction) or the Y direction (second axial direction) may be a direction perpendicular to the excitation direction of the electric field of the plurality of second antenna elements 140 in plan view. By setting the direction in which the plurality of beam portions 123X and 123Y extends to be a direction perpendicular to the excitation direction of the electric field of the plurality of second antenna elements 140, a configuration may be achieved in which mutual coupling between antennas constructed by the first antenna element 131 and the second antenna element 140 which overlap each other in the up-down direction is more easily reduced.

The plurality of beam portions 123X and 123Y may extend over a straight line coupling the centers of the plurality of second antenna elements 140 in the X direction (first axial direction) and the Y direction (second axial direction) in plan view. By the beam portions 123X and 123Y having a relative permittivity higher than that of air present in the through holes 124 passing through the positions where the electric field is smallest when the second antenna element 140 is excited, mutual coupling between antennas constructed by the first antenna element 131 and the second antenna element 140 which overlap each other in the up-down direction may be reduced.

The substrate 120 may include the frame portion 122 provided along the outer edge of the substrate 120 in plan view and coupled to the end portions of the plurality of beam portions 123X and 123Y on the outer edge side. By the frame portion 122 holding the end portions of the plurality of beam portions 123X and 123Y on the outer edge side, the antenna device 100 may be provided in which the second antenna elements 140 may be more stably held by the plurality of beam portions 123X and 123Y and a gain is increased.

Hereinafter, antenna devices of a first modification example to a 10th modification example of the embodiment will be described. Differences from the antenna device 100 illustrated in FIG. 1 will be mainly described below. The configurations of the first modification example to the 10th modification example described below may be combined.

First Modification Example

Figure 4:
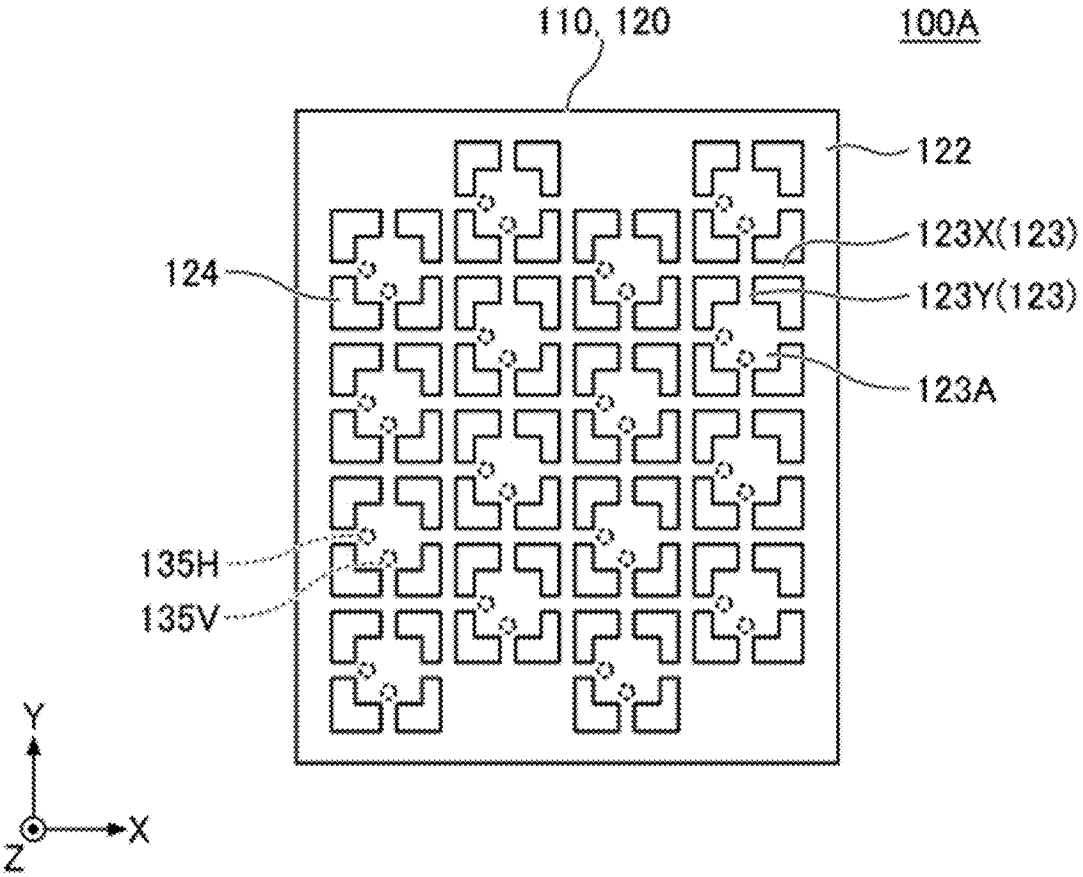
FIG. 4 is a diagram illustrating an example of a configuration of an antenna device of a first modification example of the embodiment.

FIG. 4 is a diagram illustrating an example of a configuration of an antenna device 100A of the first modification example of the embodiment. The antenna device 100A is different from the antenna device 100 illustrated in FIG. 1 in the configuration of the substrate 120. In FIG. 4, the vias 135H and 135V are indicated by broken lines for indicating the positions of the vias 135H and 135V.

The substrate 120 of the antenna device 100A is different from the substrate 120 of the antenna device 100 illustrated in FIG. 1 in that the number of beam portions 123Y extending in the Y direction is increased. The substrate 120 illustrated in FIG. 4 has a configuration in which one beam portion 123Y is added between each pair of adjacent beam portions 123Y in the substrate 120 illustrated in FIG. 1 and FIG. 2C.

As described above, if desired, the strength of the substrate 120 may be increased by increasing the number of beam portions 123Y. Since the substrate 120 includes the through holes 124 provided around the second antenna element 140, the antenna device 100A of the first modification example may reduce mutual coupling between antennas constructed by the first antenna element 131 and the second antenna element 140 which overlap each other in the up-down direction, and increase a gain of the antenna device 100A.

The antenna device 100A may have a configuration including one of the via 135H for horizontal polarization and the via 135V for vertical polarization.

Second Modification Example

Figure 5A:
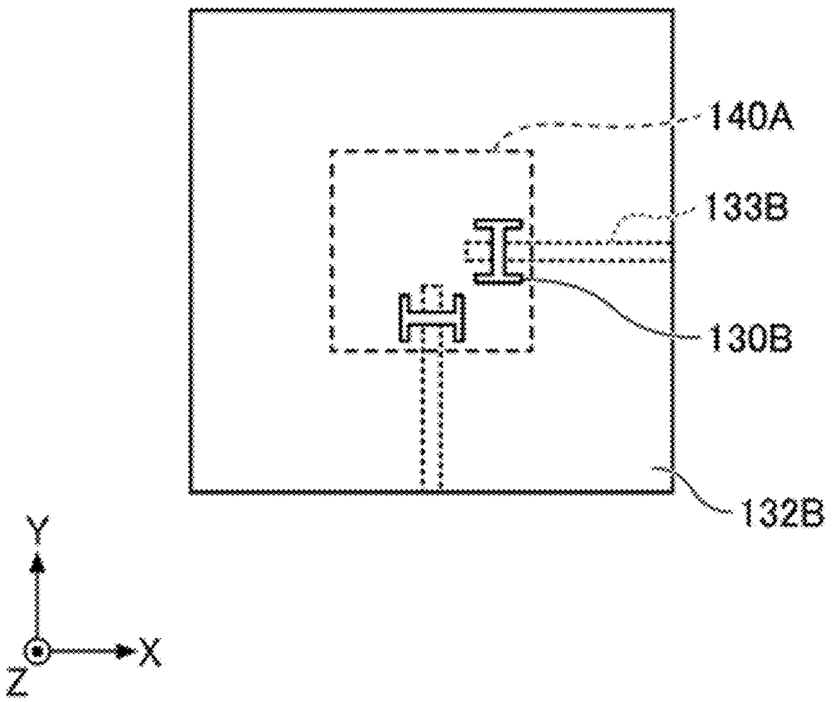
FIG. 5A is a diagram illustrating an example of a configuration of a part of an antenna device of a second modification example of the embodiment.

FIG. 5A is a diagram illustrating an example of a configuration of a part of an antenna device of the second modification example of the embodiment. The antenna device of the second modification example includes a slot power feeding unit 130B instead of the patch antenna 130. The antenna device of the second modification example includes an antenna element 140A instead of the second antenna element 140. The slot power feeding unit 130B is an example of the first radiation element, and the antenna element 140A is an example of the second radiation element. The antenna element 140A has the same configuration as that of the second antenna element 140 of the antenna device 100 of the embodiment, and is disposed at the same position as that of the second antenna element 140. Since the antenna device of the second modification example of the embodiment does not include the patch antenna 130 including the first antenna elements 131, each antenna included in the antenna device of the second modification example of the embodiment is constructed by one antenna element 140A.

FIG. 5A illustrates a ground layer 132B disposed over the upper surface 111 of the substrate 110 and power feeding lines 133B disposed over the lower surface of the substrate 110 in a portion corresponding to one antenna element 140A of the antenna device of the second modification example. The power feeding line 133B and the ground layer 132B construct a microstrip line. Two slot power feeding units 130B are formed in the ground layer 132B for one antenna element 140A.

As an example, the two slot power feeding units 130B are positioned inside the outer edge of the antenna element 140A in plan view. As an example, one slot power feeding unit 130B is positioned along the outer edge extending in the Y direction on the +X direction side of the antenna element 140A in plan view. The power feeding line 133B extending in the X direction is provided immediately below this slot power feeding unit 130B. By feeding power to this slot power feeding unit 130B from the power feeding line 133B, the antenna element 140A may be excited in the X direction and a horizontally polarized radio wave may be radiated.

As an example, the other slot power feeding unit 130B is positioned along the outer edge extending in the X direction on the −Y direction side of the antenna element 140A in plan view. The power feeding line 133B extending in the Y direction is provided immediately below this slot power feeding unit 130B. By feeding power to this slot power feeding unit 130B, the antenna element 140A may be excited in the Y direction and a vertically polarized radio wave may be radiated.

The antenna device of the second modification example of the embodiment including the slot power feeding unit 130B instead of the patch antenna 130 illustrated in FIG. 2A includes the substrate 110 (first dielectric substrate) including the surface 111, the substrate 120 (second dielectric substrate) facing the substrate 110, a plurality of first radiation elements provided over the surface 111, a plurality of antenna elements 140A provided over the surface 121 of the substrate 120 and coupled to the plurality of first radiation elements, and the through holes 124 formed around the plurality of antenna elements 140A of the substrate 120 in plan view, and the plurality of first radiation elements is a plurality of slot power feeding units 130B. The surface 121 is an example of the second surface.

As described above, since the through holes 124 are provided around the antenna element 140A in plan view, the antenna device of the second modification example of the embodiment may reduce the effective relative permittivity of the constituent elements around the antenna element 140A. For this reason, mutual coupling between antennas constructed by the antenna element 140A may be reduced, and a gain of the antenna device of the second modification example of the embodiment may be increased. Since the through holes 124 are provided around the antenna element 140A in plan view, an electric field leaking in the +Z direction increases and electric fields leaking in the X direction and the Y direction are reduced, thereby reducing mutual coupling between adjacent antennas and increasing a gain.

Therefore, according to the second modification example of the embodiment, the antenna device may be provided in which a gain is increased.

The antenna device of the second modification example may have a configuration including one of the slot power feeding unit 130B for horizontal polarization and the slot power feeding unit 130B for vertical polarization.

The antenna element 140A may be provided over the surface of the substrate 120 on the +Z direction side. In this case, the surface of the substrate 120 on the +Z direction side is an example of the second surface.

The antenna device of the second modification example may have a configuration including an antenna element different from the antenna element 140A over the surface of the substrate 120 on the +Z direction side. The antenna device of the second modification example having such configuration will be described with reference to FIG. 5B and FIG. 5C.

Figure 5B:
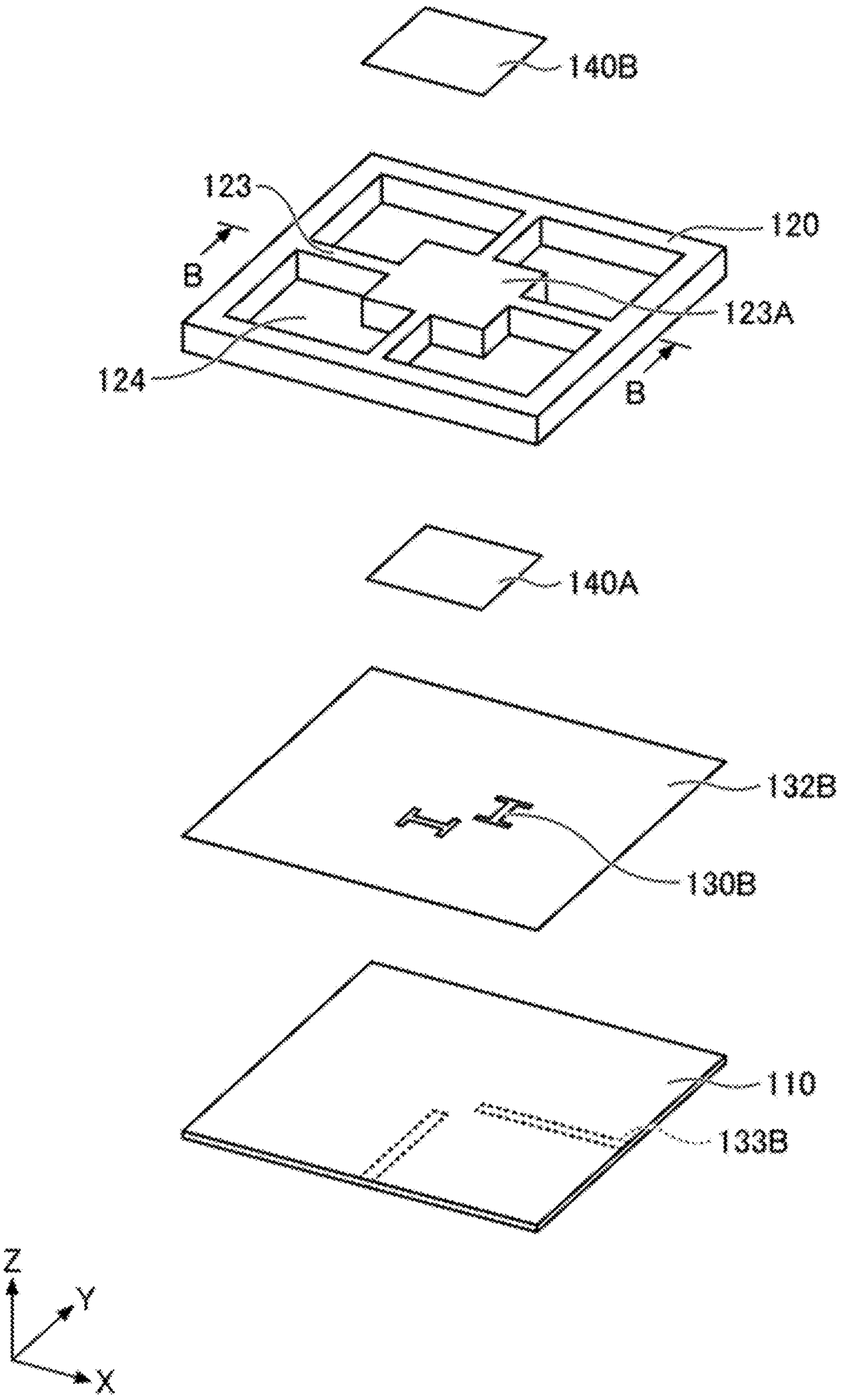
FIG. 5B is a diagram illustrating an example of a configuration of a part of the antenna device of the second modification example of the embodiment.
Figure 5C:
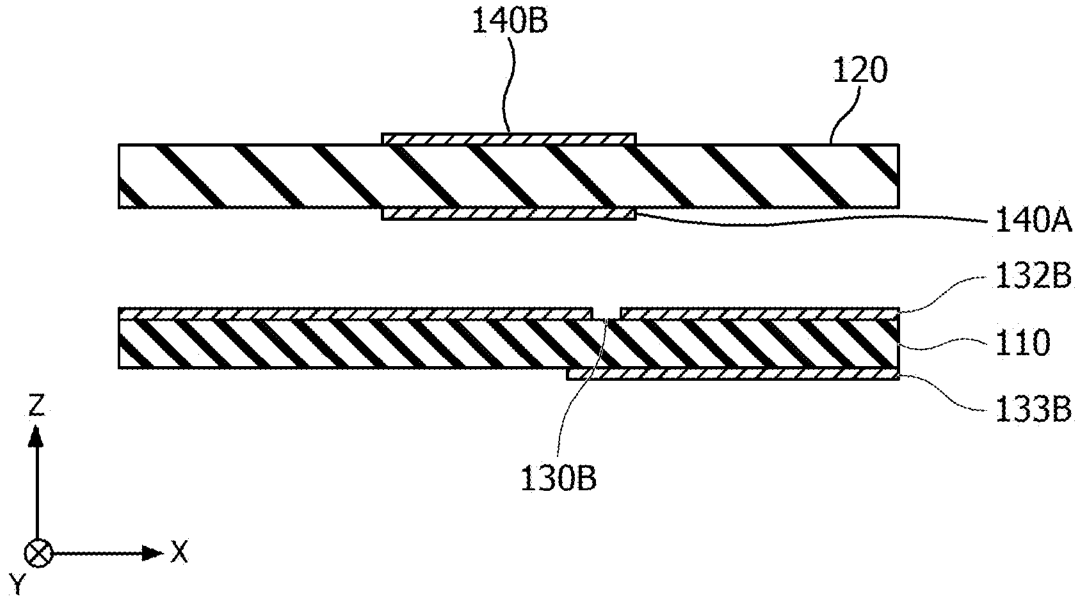
FIG. 5C is a diagram illustrating an example of a configuration of a part of the antenna device of the second modification example of the embodiment.

FIG. 5B and FIG. 5C are diagrams illustrating an example of a configuration of a portion corresponding to one antenna of a plurality of antennas included in the antenna device of the second modification example. FIG. 5B is an exploded view, and FIG. 5C is a sectional view. The cross section illustrated in FIG. 5C is a cross section corresponding to the cross section of the substrate 120 viewed from B-B arrows in FIG. 5B. The cross section viewed from B-B arrows is a cross section parallel to the XZ plane that passes through the center of the holding portion 123A in the Y direction.

As illustrated in FIG. 5B and FIG. 5C, an antenna included in the antenna device of the second modification example includes the substrate 110 in which the power feeding lines 133B are formed over the surface on the −Z direction side and the ground layer 132B is formed over the surface on the +Z direction side, the antenna element 140A, the substrate 120, and an antenna element 140B.

The antenna element 140A is provided over the surface of the holding portion 123A of the substrate 120 on the −Z direction side, and the antenna element 140B is provided over the surface of the holding portion 123A of the substrate 120 on the +Z direction side. By making the antenna elements 140A and 140B have different sizes from each other and making the resonance frequencies different from each other, a wider bandwidth may be achieved as compared with a case where the antenna element 140B is not included.

Third Modification Example

Figure 6A:
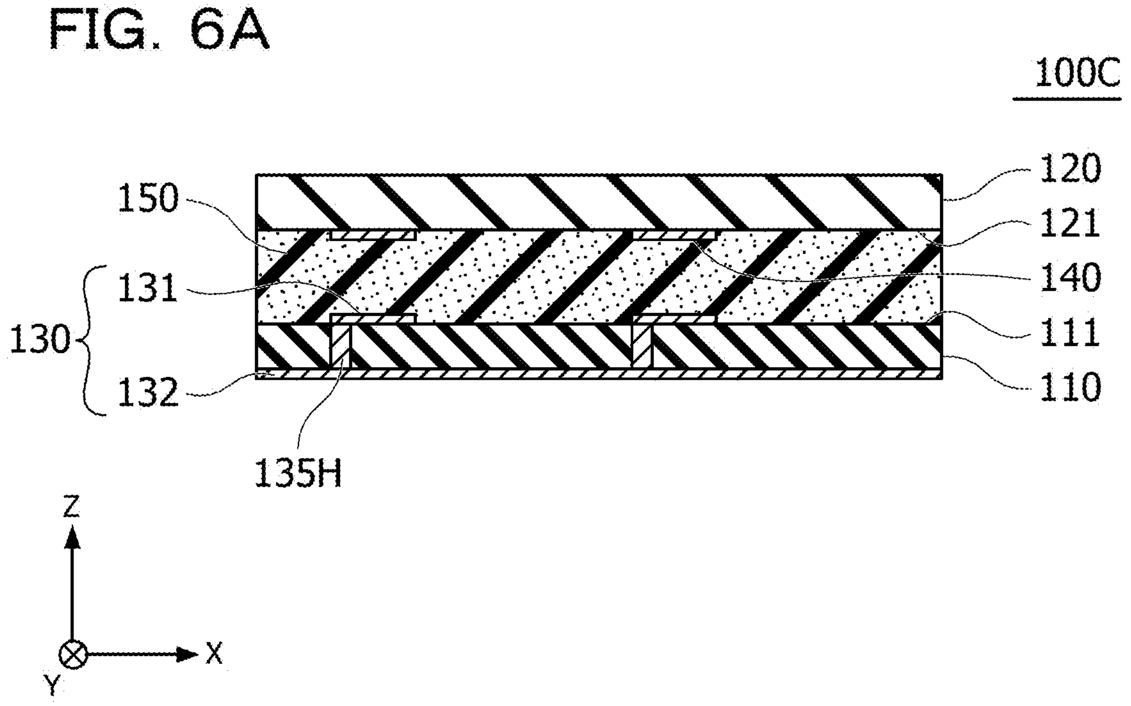
FIG. 6A is a diagram illustrating an example of a cross-sectional configuration of an antenna device of a third modification example of the embodiment.
Figure 6B:
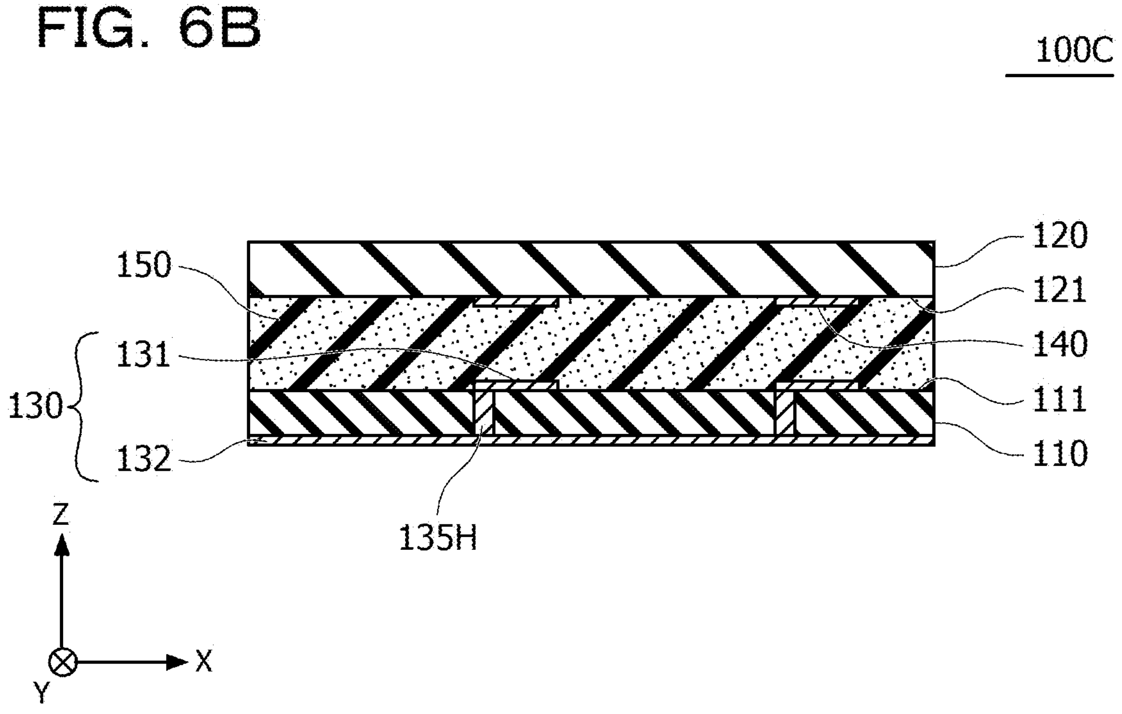
FIG. 6B is a diagram illustrating an example of a cross-sectional configuration of the antenna device of the third modification example of the embodiment.

FIG. 6A and FIG. 6B are diagrams illustrating an example of a cross-sectional configuration of an antenna device 100C of the third modification example of the embodiment. As with FIG. 1B, FIG. 6A illustrates an example of a cross-sectional configuration corresponding to the cross section viewed from A1-A1 arrows in FIG. 1A, and as with FIG. 1C, FIG. 6B illustrates an example of a cross-sectional configuration corresponding to the cross section viewed from A2-A2 arrows in FIG. 1A.

The antenna device 100C has a configuration in which a dielectric member 150 is added between the substrates 110 and 120 of the antenna device 100 illustrated in FIG. 1. The dielectric member 150 is a dielectric member having a relative permittivity lower than the relative permittivities of the substrate 110 and the substrate 120. For example, the antenna device 100C further includes the dielectric member 150 having a relative permittivity lower than the relative permittivities of the substrate 110 and the substrate 120.

As an example, the dielectric member 150 may be realized by a plate-shaped member formed of polytetrafluoroethylene (PTFE), a foamed substrate that is a substrate formed of expanded polystyrene, a spacer made of a dielectric or a metal and formed with a through hole or a hole, or the like. As an example, while the relative permittivity of an epoxy resin usable as the substrates 110 and 120 is 3.3, the relative permittivity of PTFE is 2.2 to 3.0, and the relative permittivity of a foamed substrate is 1.1 to 1.3.

Although the dielectric member 150 is positioned between the substrates 110 and 120 in FIG. 6A and FIG. 6B, the dielectric member 150 may be positioned inside at least a part of the through holes 124 in addition to between the substrates 110 and 120 or instead of between the substrates 110 and 120.

The dielectric member 150 has a relative permittivity lower than the relative permittivities of the substrates 110 and 120. For this reason, as with the antenna device 100 of the embodiment illustrated in FIG. 1A to FIG. 2C, the antenna device 100C of the third modification example of the embodiment may reduce mutual coupling between antennas constructed by the first antenna element 131 and the second antenna element 140 which overlap each other in the up-down direction, and increase a gain of the antenna device 100C.

The antenna device 100C may have a configuration including one of the via 135H for horizontal polarization and the via 135V for vertical polarization.

The dielectric member 150 may be added to any of the antenna device 100 of the embodiment and the antenna devices 100A and 100C to 100J of the first modification example to the 10th modification example of the embodiment.

Fourth Modification Example

Figure 7:
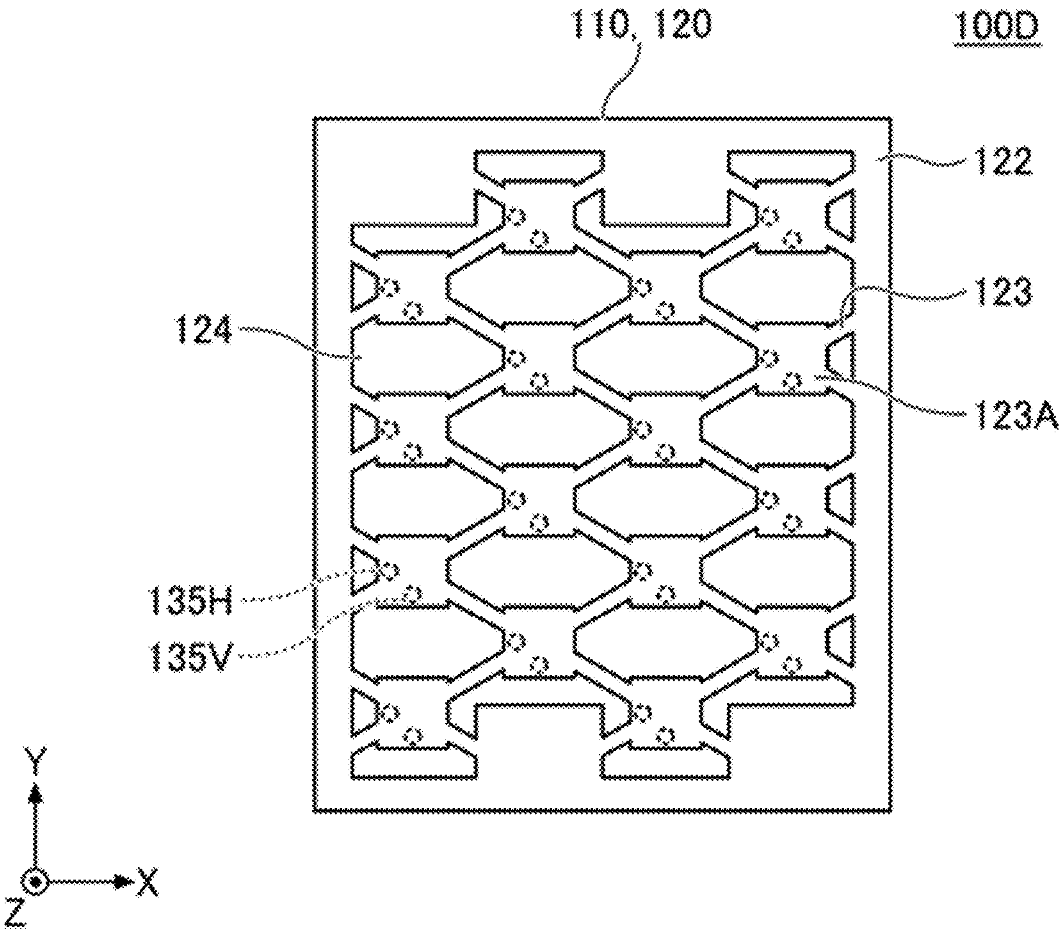
FIG. 7 is a diagram illustrating an example of a configuration of an antenna device of a fourth modification example of the embodiment.

FIG. 7 is a diagram illustrating an example of a configuration of an antenna device 100D of the fourth modification example of the embodiment. The antenna device 100D is different from the antenna device 100 illustrated in FIG. 1 in the configuration of the substrate 120. In FIG. 7, the vias 135H and 135V are indicated by broken lines for indicating the positions of the vias 135H and 135V.

The substrate 120 of the antenna device 100D is different from the substrate 120 of the antenna device 100 illustrated in FIG. 1 in that the substrate 120 includes the plurality of beam portions 123 extending in directions at an angle to the X direction and the Y direction. The angle of the beam portions 123 with respect to the X direction and the Y direction is larger than 0 degrees in absolute value. The plurality of beam portions 123 of the substrate 120 illustrated in FIG. 7 extends in directions at an angle to the X direction and the Y direction so as to surround the through holes 124 having a rhombic shape in plan view.

As described above, by using the substrate 120 including the plurality of beam portions 123 extending in directions at an angle to the X direction and the Y direction, mutual coupling between antennas constructed by the first antenna element 131 and the second antenna element 140 which overlap each other in the up-down direction may be reduced, and a gain of the antenna device 100D may be increased.

The antenna device 100D may have a configuration including one of the via 135H for horizontal polarization and the via 135V for vertical polarization.

Fifth Modification Example

Figure 8:
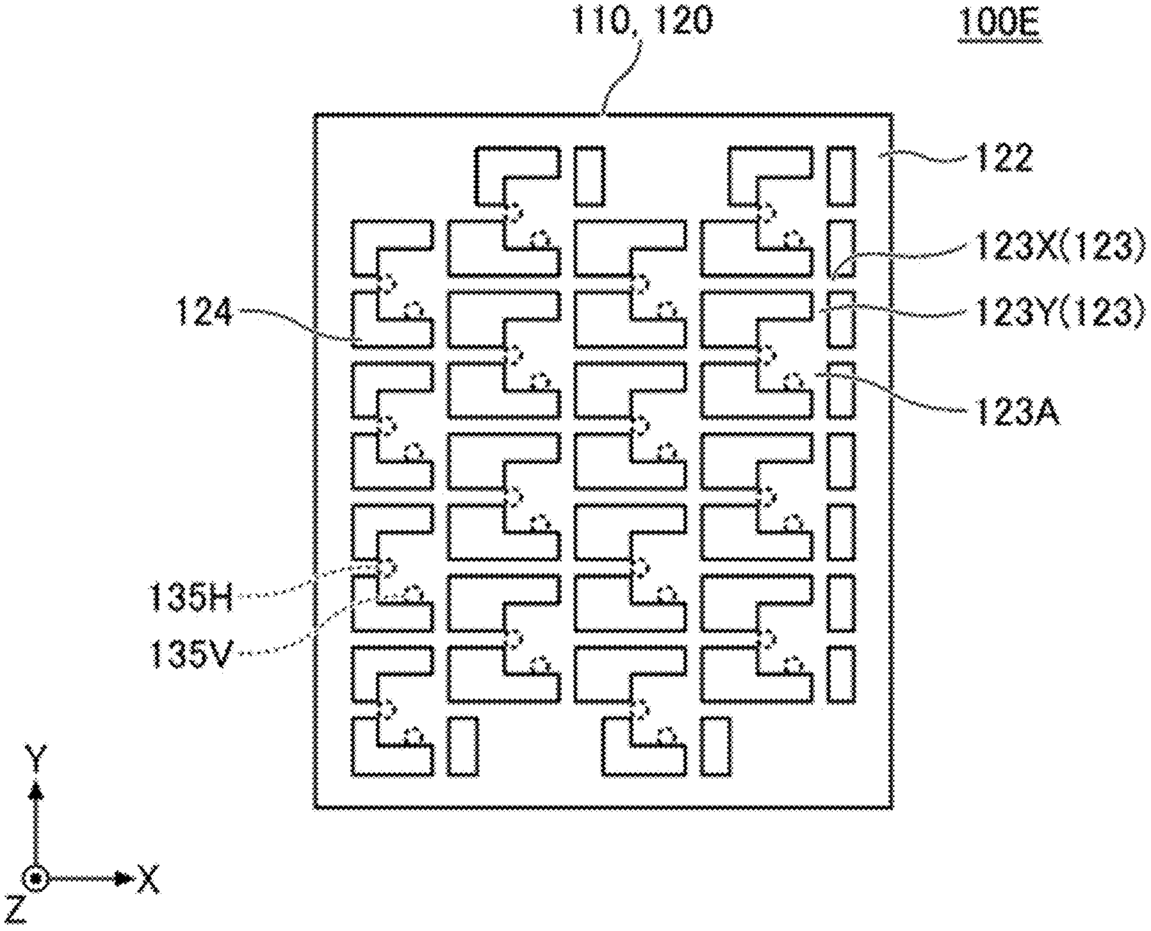
FIG. 8 is a diagram illustrating an example of a configuration of an antenna device of a fifth modification example of the embodiment.

FIG. 8 is a diagram illustrating an example of a configuration of an antenna device 100E of the fifth modification example of the embodiment. The antenna device 100E is different from the antenna device 100 illustrated in FIG. 1 in the configuration of the substrate 120. In FIG. 8, the vias 135H and 135V are indicated by broken lines for indicating the positions of the vias 135H and 135V.

The substrate 120 of the antenna device 100E is different from the substrate 120 of the antenna device 100 illustrated in FIG. 1 in the position of the beam portions 123Y with respect to the holding portions 123A. In FIG. 8, it is different from the substrate 120 of the antenna device 100 illustrated in FIG. 1 in that the beam portions 123Y are shifted from the centers of the holding portions 123A in the X direction to the +X direction side in plan view.

As described above, the beam portions 123Y of the substrate 120 may be shifted from the centers of the holding portions 123A in the X direction to the +X direction side in plan view. The shifting of the beam portions 123Y in the X direction is made preferably to such an extent that mutual coupling between antennas constructed by the first antenna element 131 and the second antenna element 140 which overlap each other in the up-down direction is not affected.

Since the substrate 120 includes the through holes 124, such antenna device 100E of the fifth modification example may reduce mutual coupling between antennas constructed by the first antenna element 131 and the second antenna element 140 which overlap each other in the up-down direction, and increase a gain of the antenna device 100E.

The beam portions 123Y of the substrate 120 may be shifted from the centers of the holding portions 123A in the X direction to the −X direction side in plan view. The beam portions 123X of the substrate 120 may be shifted from the centers of the holding portions 123A in the Y direction to the +Y direction side or the −Y direction side in plan view.

The antenna device 100E may have a configuration including one of the via 135H for horizontal polarization and the via 135V for vertical polarization.

Sixth Modification Example

Figure 9:
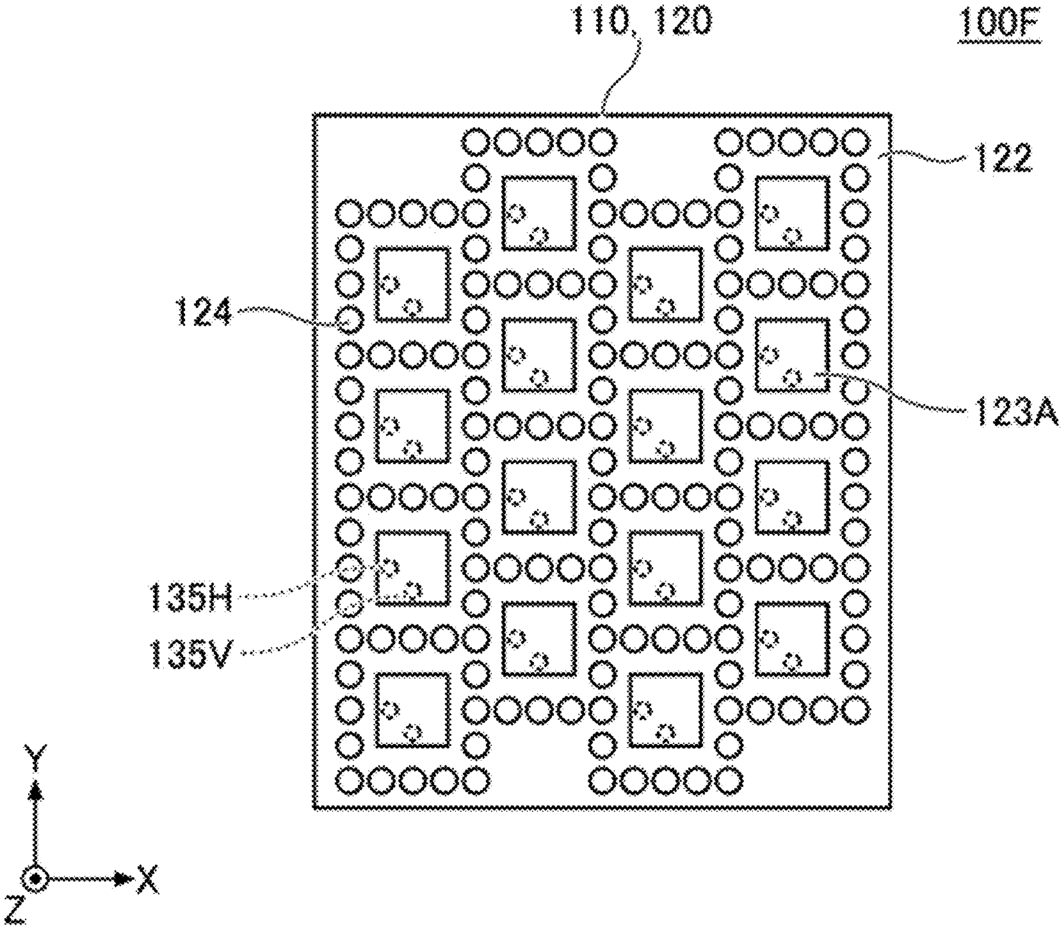
FIG. 9 is a diagram illustrating an example of a configuration of an antenna device of a sixth modification example of the embodiment.

FIG. 9 is a diagram illustrating an example of a configuration of an antenna device 100F of the sixth modification example of the embodiment. The antenna device 100F is different from the antenna device 100 illustrated in FIG. 1 in the configuration of the substrate 120. In FIG. 9, the vias 135H and 135V are indicated by broken lines for indicating the positions of the vias 135H and 135V.

The substrate 120 of the antenna device 100F is different from the substrate 120 of the antenna device 100 illustrated in FIG. 1 in that the plurality of through holes 124 is columnar through holes formed by drilling and the substrate does not include the beam portions 123X and 123Y. In plan view, each holding portion 123A is surrounded by the plurality of through holes 124. For example, for each of the plurality of second antenna elements 140, the plurality of through holes 124 is formed so as to surround the second antenna element 140 in plan view.

As described above, the substrate 120 may have a configuration including the plurality of through holes 124 formed so as to surround each second antenna element 140. This is because mutual coupling between antennas constructed by the first antenna element 131 and the second antenna element 140 which overlap each other in the up-down direction may be reduced by providing the through holes 124 around the second antenna element 140.

As described above, since the substrate 120 includes the plurality of through holes 124 surrounding the second antenna element 140, the antenna device 100F of the sixth modification example may reduce mutual coupling between antennas constructed by the first antenna element 131 and the second antenna element 140 which overlap each other in the up-down direction, and increase a gain of the antenna device 100F.

The plurality of through holes 124 may be through holes formed by a method other than drilling. For example, the plurality of through holes may be through holes having a shape other than a cylindrical shape such as a quadrangular prism.

The antenna device 100F may have a configuration including one of the via 135H for horizontal polarization and the via 135V for vertical polarization.

Seventh Modification Example

Figure 10:
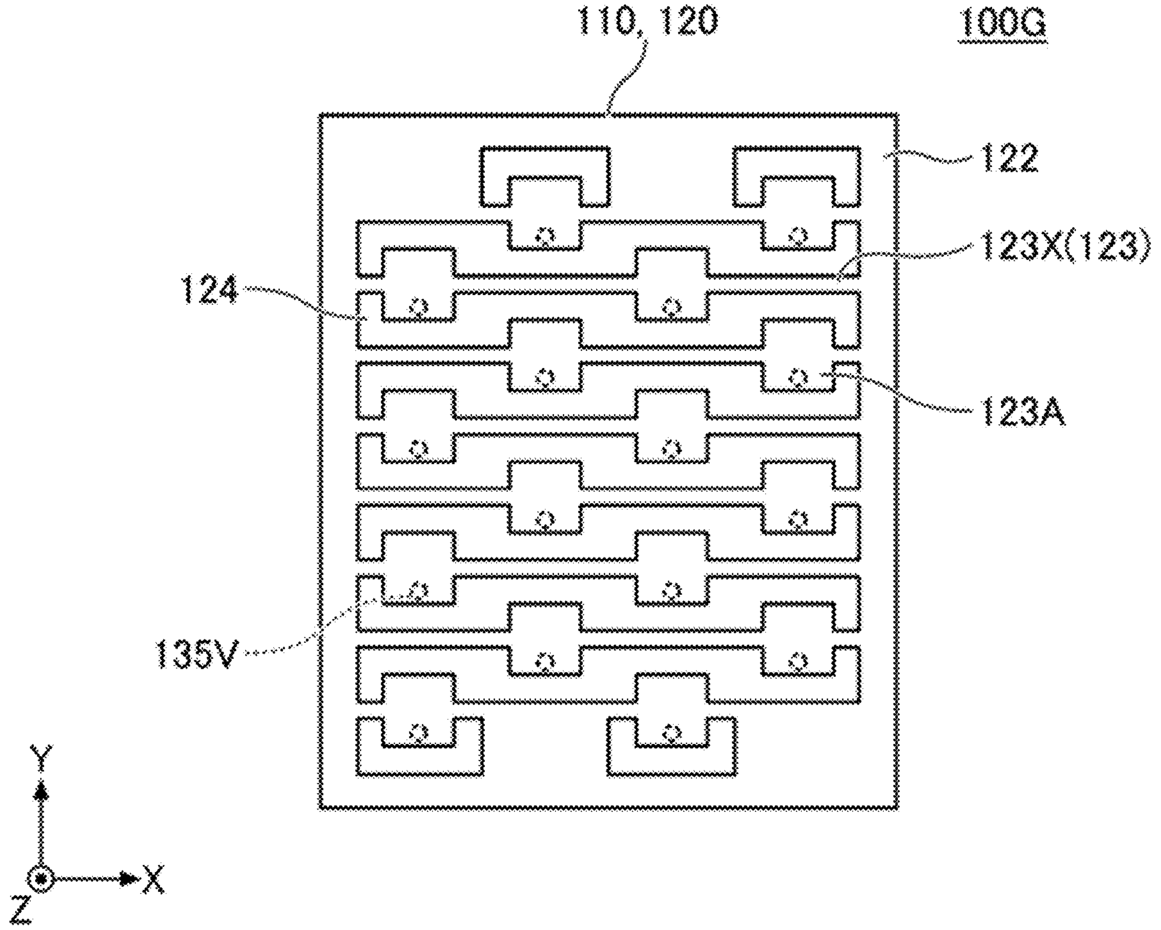
FIG. 10 is a diagram illustrating an example of a configuration of an antenna device of a seventh modification example of the embodiment.

FIG. 10 is a diagram illustrating an example of a configuration of an antenna device 100G of the seventh modification example of the embodiment. The antenna device 100G is different from the antenna device 100 illustrated in FIG. 1 in the configuration of the substrate 120. In FIG. 10, the via 135V is indicated by a broken line for indicating the position of the via 135V.

The substrate 120 of the antenna device 100G is different from the substrate 120 of the antenna device 100 illustrated in FIG. 1 in that the substrate does not include the beam portions 123Y extending in the Y direction. The substrate 120 illustrated in FIG. 10 has a configuration in which the plurality of beam portions 123Y in the substrate 120 illustrated in FIG. 1 and FIG. 2C is omitted. Another difference from the antenna device 100 illustrated in FIG. 1 is that the antenna device 100G does not include the via 135H for horizontal polarization.

Since the substrate 120 includes the through holes 124 provided around the second antenna element 140, the antenna device 100G of the seventh modification example may reduce mutual coupling between antennas constructed by the first antenna element 131 and the second antenna element 140 which overlap each other in the up-down direction, and increase a gain. Since the planar size of the through holes 124 is increased by not including the beam portions 123Y, a configuration is obtained in which an electric field is more likely to propagate in the upward direction (+Z direction).

The antenna device 100G includes the via 135V for vertical polarization, but does not include the via 135H for horizontal polarization. The beam portions 123Y are not provided. The beam portions 123X pass through, in the X direction, the centers in the Y direction of the holding portions 123A that hold the second antenna elements 140 radiating a vertically polarized radio wave. For example, the beam portions 123X pass through the positions where the electric field is smallest when the second antenna element 140 is excited. For this reason, in a configuration in which a vertically polarized radio wave is radiated, the antenna device 100G may effectively reduce mutual coupling between antennas constructed by the first antenna element 131 and the second antenna element 140 which overlap each other in the up-down direction, and increase a gain of the antenna device 100G.

The antenna device 100G may be configured such that, by adding the via 135H for horizontal polarization below each first antenna element 131 of the substrate 110, a horizontally polarized radio wave and a vertically polarized radio wave are radiated.

Eighth Modification Example

Figure 11:
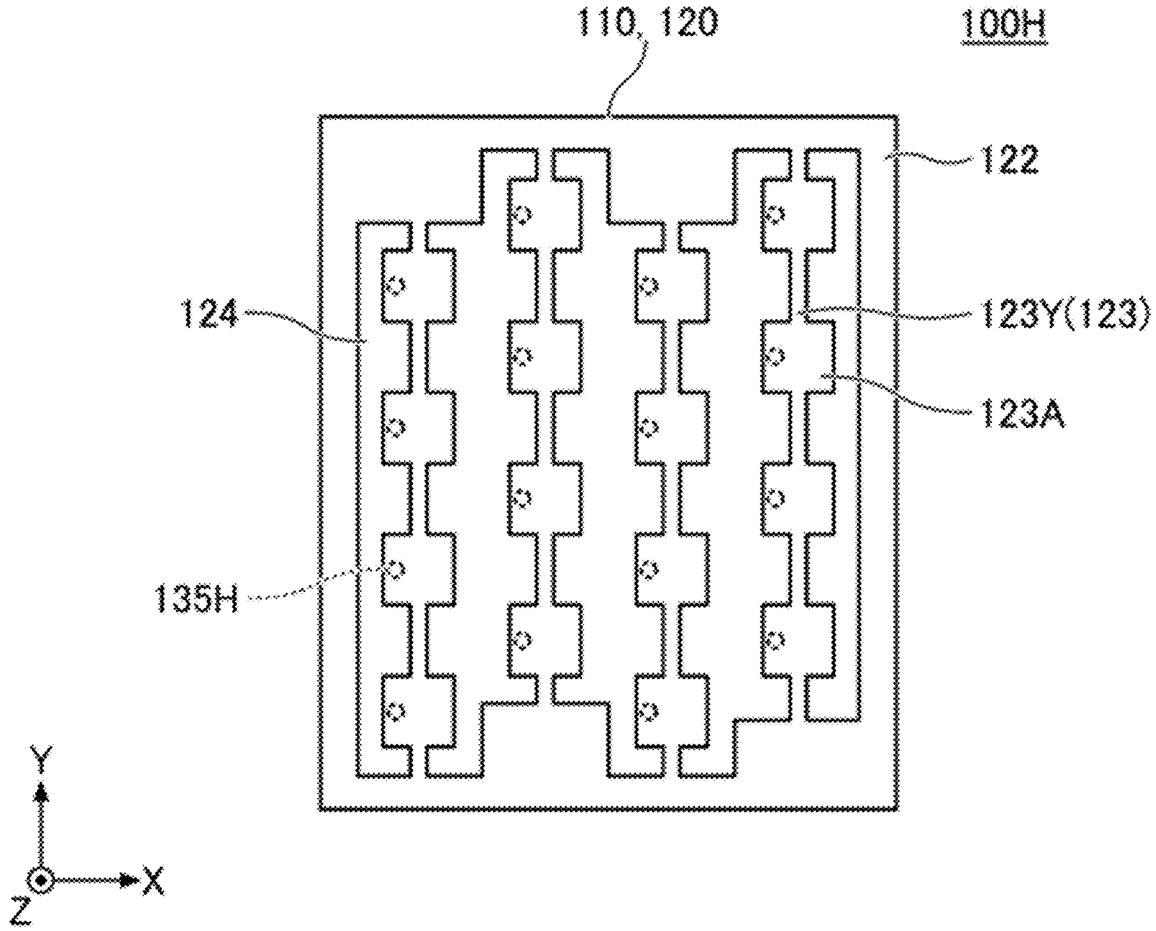
FIG. 11 is a diagram illustrating an example of a configuration of an antenna device of an eighth modification example of the embodiment.

FIG. 11 is a diagram illustrating an example of a configuration of an antenna device 100H of the eighth modification example of the embodiment. The antenna device 100H is different from the antenna device 100 illustrated in FIG. 1 in the configuration of the substrate 120. In FIG. 11, the via 135H is indicated by a broken line for indicating the position of the via 135H.

The substrate 120 of the antenna device 100H is different from the substrate 120 of the antenna device 100 illustrated in FIG. 1 in that the substrate does not include the beam portions 123X extending in the X direction. The substrate 120 illustrated in FIG. 11 has a configuration in which the plurality of beam portions 123X in the substrate 120 illustrated in FIG. 1 and FIG. 2C is omitted. Another difference from the antenna device 100 illustrated in FIG. 1 is that the antenna device 100H does not include the via 135V for vertical polarization.

Since the substrate 120 includes the through holes 124 provided around the second antenna element 140, the antenna device 100H of the eighth modification example may reduce mutual coupling between antennas constructed by the first antenna element 131 and the second antenna element 140 which overlap each other in the up-down direction, and increase a gain. Since the planar size of the through holes 124 is increased by not including the beam portions 123X, a configuration is obtained in which an electric field is more likely to propagate in the upward direction (+Z direction).

The antenna device 100H includes the via 135H for horizontal polarization, but does not include the via 135V for vertical polarization. The beam portions 123X are not provided. The beam portions 123Y pass through, in the Y direction, the centers in the X direction of the holding portions 123A that hold the second antenna elements 140 radiating a horizontally polarized radio wave. For example, the beam portions 123Y pass through the positions where the electric field is smallest when the second antenna element 140 is excited. For this reason, in a configuration in which a horizontally polarized radio wave is radiated, the antenna device 100H may effectively reduce mutual coupling between antennas constructed by the first antenna element 131 and the second antenna element 140 which overlap each other in the up-down direction, and increase a gain of the antenna device 100H.

The antenna device 100H may be configured such that, by adding the via 135V for vertical polarization below each first antenna element 131 of the substrate 110, a horizontally polarized radio wave and a vertically polarized radio wave are radiated.

Ninth Modification Example

Figure 12:
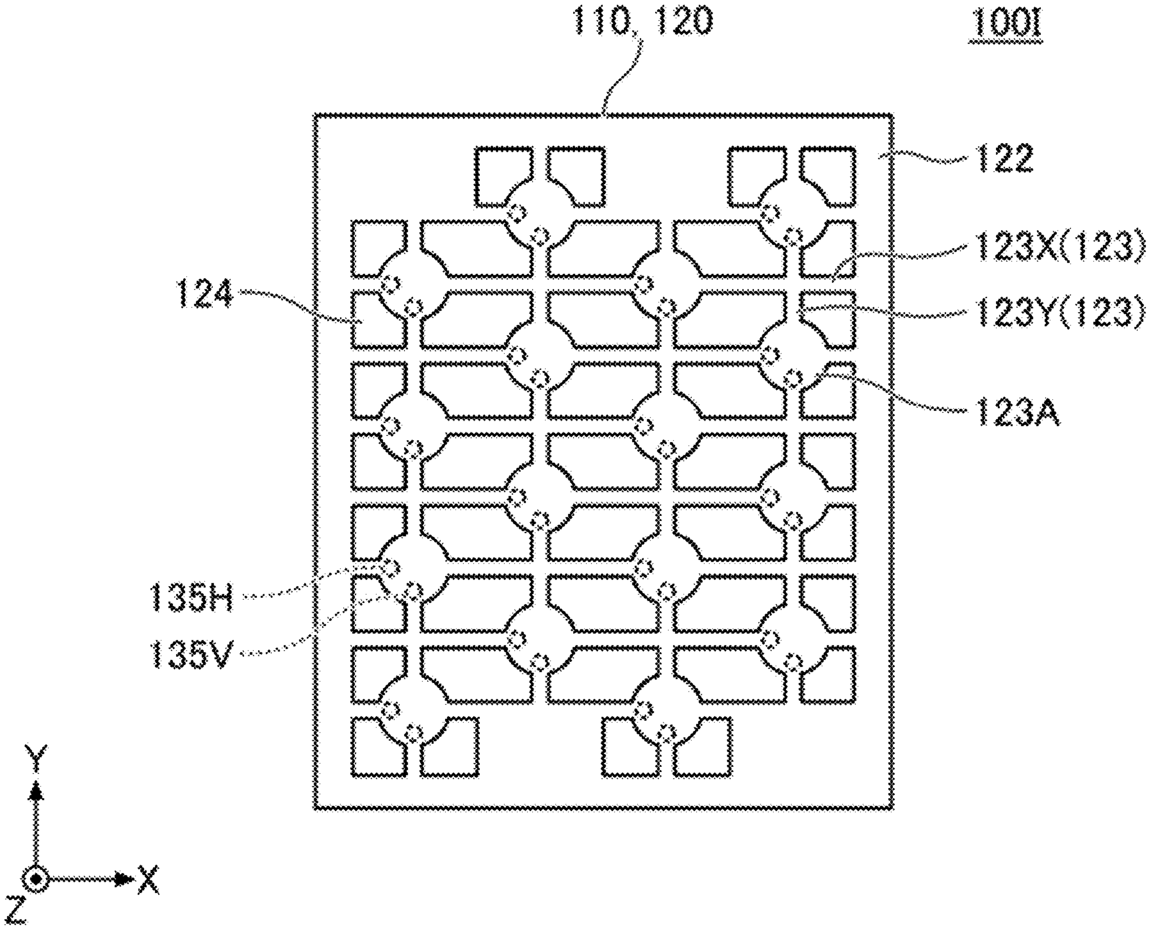
FIG. 12 is a diagram illustrating an example of a configuration of an antenna device of a ninth modification example of the embodiment.

FIG. 12 is a diagram illustrating an example of a configuration of an antenna device 100I of the ninth modification example of the embodiment. The antenna device 100I is different from the antenna device 100 illustrated in FIG. 1 in the shape of the first antenna element 131, and includes the circular first antenna element 131. The antenna device 100I is different from the antenna device 100 illustrated in FIG. 1 in the shape of the second antenna element 140, and includes the circular second antenna element 140.

As described above, the first antenna element 131 of the patch antenna 130 may be circular in plan view. Since the substrate 120 includes the through holes 124 provided around the second antenna element 140, the antenna device 100I of the ninth modification example may reduce mutual coupling between antennas constructed by the first antenna element 131 and the second antenna element 140 which overlap each other in the up-down direction, and increase a gain of the antenna device 100I.

The circular first antenna element 131 may be applied to any of the antenna device 100 of the embodiment, the antenna device 100A of the first modification example of the embodiment, and the antenna devices 100C to 100H and 100J of the third modification example to the eighth modification example and the 10th modification example of the embodiment.

The antenna device 100I may have a configuration including one of the via 135H for horizontal polarization and the via 135V for vertical polarization.

10th Modification Example

Figure 13:
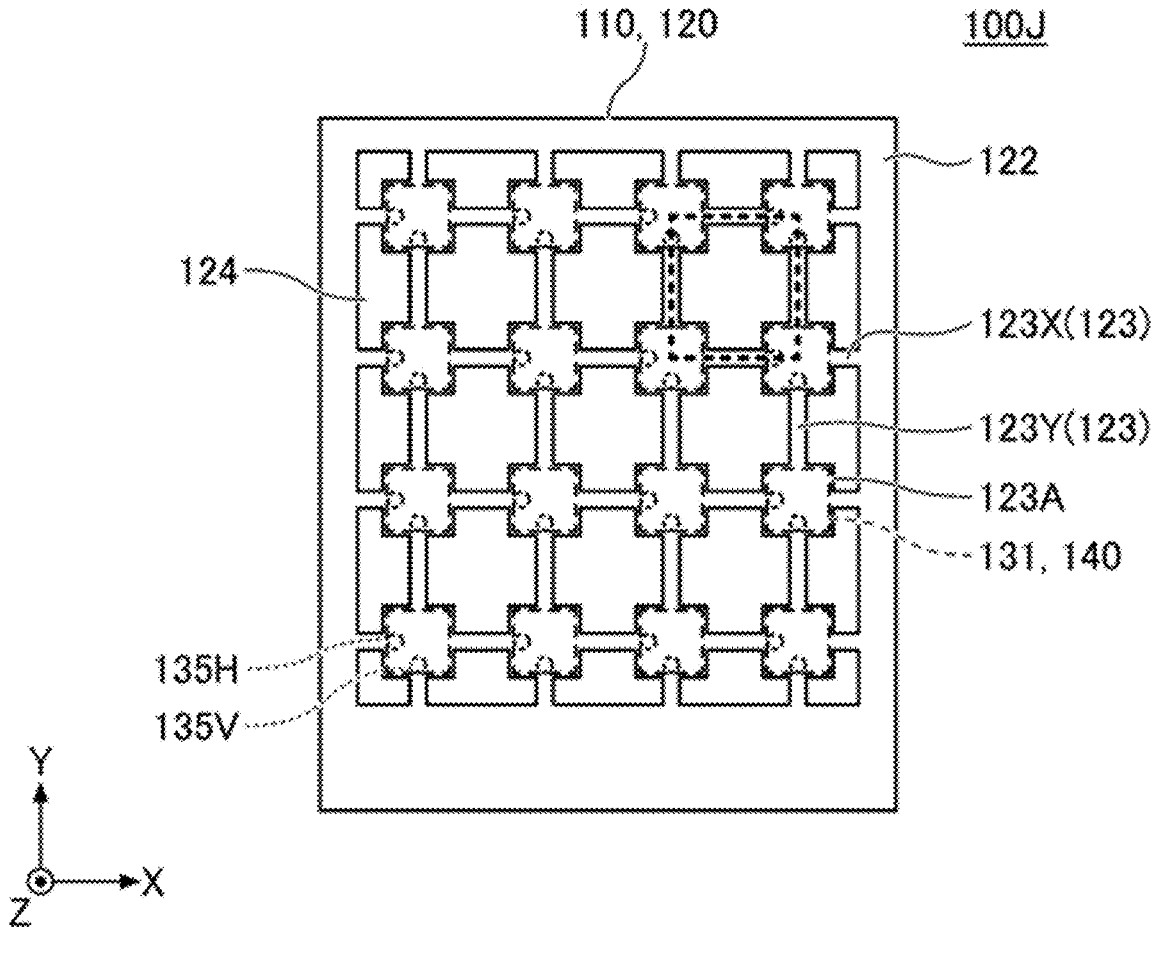
FIG. 13 is a diagram illustrating an example of a configuration of an antenna device of a 10th modification example of the embodiment.

FIG. 13 is a diagram illustrating an example of a configuration of an antenna device 100J of the 10th modification example of the embodiment. The antenna device 100J is different from the antenna device 100 illustrated in FIG. 1 in the arrangement of the first antenna elements 131 of the patch antenna 130 disposed over the substrate 110, the shape of the substrate 120, and the arrangement of the second antenna elements 140. In FIG. 13, the vias 135H and 135V are indicated by broken lines for indicating the positions of the vias 135H and 135V. The first antenna elements 131 and the second antenna elements 140 below the holding portion 123A are indicated by broken lines for indicating the positions of the first antenna elements 131 and the second antenna elements 140.

The antenna device 100J is configured such that the centers of the first antenna element 131, the holding portion 123A, and the second antenna element 140 in plan view are disposed at the vertices of a square. The length of one side of the square is equal to the length of one side of the equilateral triangle illustrated in FIG. 2A to FIG. 2C. For the substrate 120, the beam portions 123X and 123Y extend at equal intervals in the X direction and the Y direction in accordance with the arrangement of the holding portions 123A described above.

In the antenna device 100J, the pitches between the first antenna elements 131 and between the second antenna elements 140, adjacent to each other in the X direction and the Y direction, are equal to the length of one side of the square. The intervals between the centers of the first antenna elements 131 and between the centers of the second antenna elements 140, adjacent to each other in a direction at 45 degrees with respect to the X direction and the Y direction, are $\sqrt{2}$ times the length of one side of the square. In the antenna device 100J, the intervals between the centers of the first antenna elements 131 and between the centers of the second antenna elements 140, adjacent to each other in the direction at 45 degrees with respect to the X direction and the Y direction, are wider than the intervals in the antenna device 100 illustrated in FIG. 1. The arrangement of the first antenna elements 131 and the second antenna elements 140 in plan view is not limited to a triangular or rectangular arrangement.

Since the substrate 120 includes the through holes 124 provided around the second antenna element 140, such antenna device 100J of the 10th modification example may reduce mutual coupling between antennas constructed by the first antenna element 131 and the second antenna element 140 which overlap each other in the up-down direction, and increase a gain of the antenna device 100J.

In the antenna device 100J, the length of one side of a square coupling the centers of the first antenna element 131, the holding portion 123A, and the second antenna element 140 may be shorter than the length of one side of the equilateral triangle illustrated in FIG. 2A to FIG. 2C. For example, the intervals between the centers of the first antenna elements 131, between the centers of the holding portions 123A, and between the centers of the second antenna elements 140, adjacent to each other in the direction at 45 degrees with respect to the X direction and the Y direction, may be equal to the length of one side of the equilateral triangle illustrated in FIG. 2A to FIG. 2C.

The arrangement of the holding portions 123A, the first antenna elements 131, and the second antenna elements 140 in the antenna device 100J of the 10th modification example of the embodiment may be applied to any of the antenna device 100 of the embodiment, the antenna device 100A of the first modification example of the embodiment, and the antenna devices 100C to 100I of the third modification example to the ninth modification example of the embodiment.

The antenna device 100J may have a configuration including one of the via 135H for horizontal polarization and the via 135V for vertical polarization.

Hereinafter, an 11th modification example to a 14th modification example of the embodiment will be described. Hereinafter, constituent elements similar to the constituent elements described above are denoted by the same reference signs, and description thereof may be omitted. The 11th modification example to the 14th modification example may be combined with the embodiment and the first modification example to the 10th modification example described above.

11th Modification Example

Figure 14A:
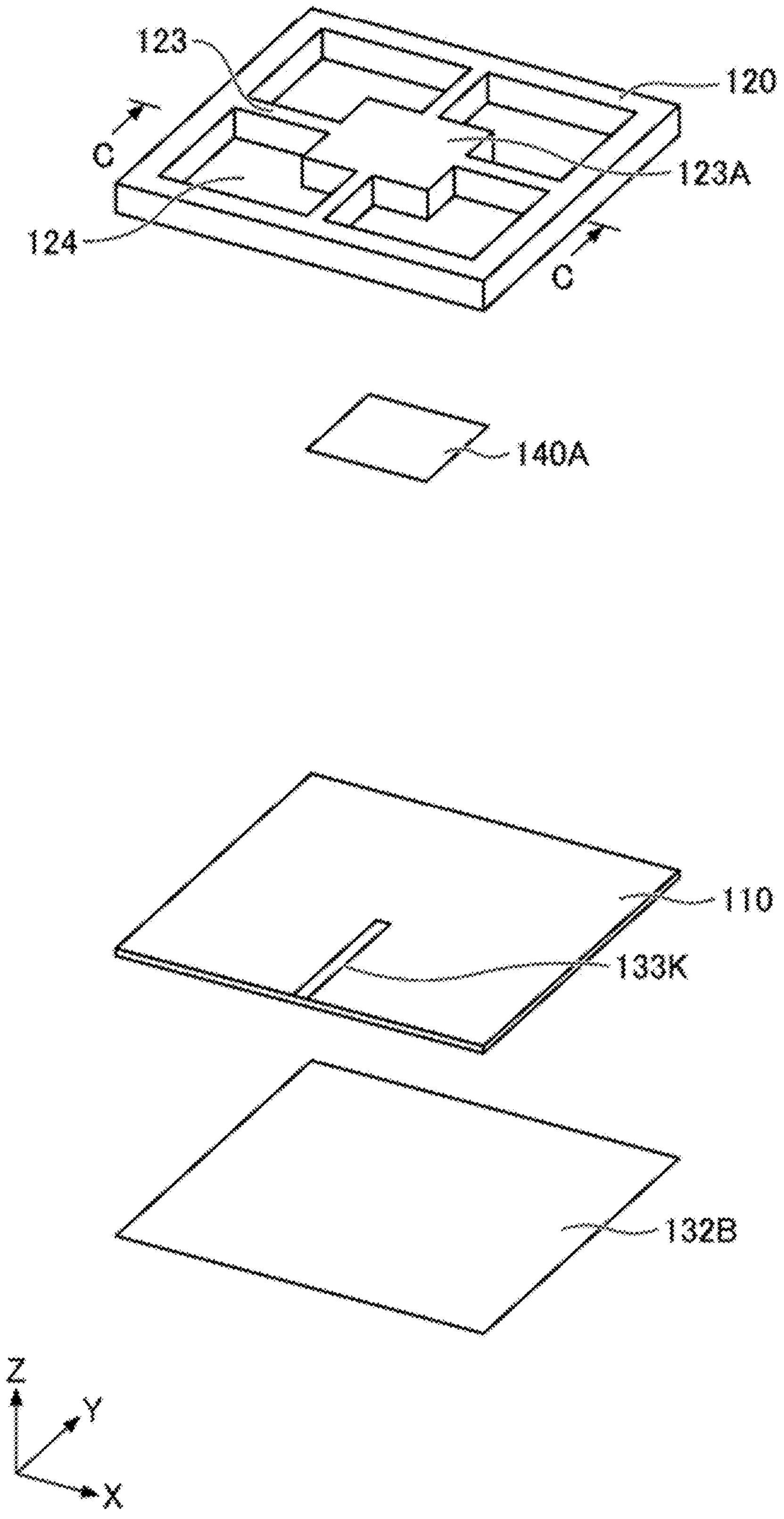
FIG. 14A is a diagram illustrating an example of a configuration of an antenna included in an antenna device of an 11th modification example of the embodiment.
Figure 14B:
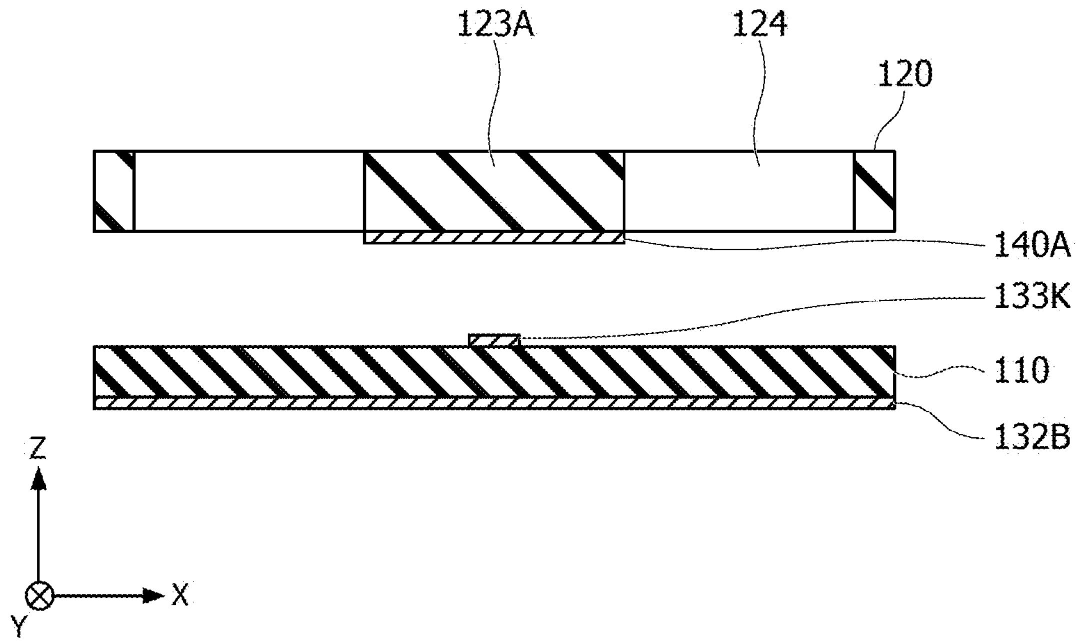
FIG. 14B is a diagram illustrating an example of a configuration of an antenna included in the antenna device of the 11th modification example of the embodiment.

FIG. 14A and FIG. 14B are diagrams illustrating an example of a configuration of an antenna included in an antenna device of the 11th modification example of the embodiment.

FIG. 14A and FIG. 14B are diagrams illustrating an example of a configuration of a portion corresponding to one antenna of a plurality of antennas included in the antenna device of the 11th modification example. FIG. 14A is an exploded view, and FIG. 14B is a sectional view. The cross section illustrated in FIG. 14B is a cross section of the antenna corresponding to the cross section of the substrate 120 viewed from C-C arrows in FIG. 14A. The cross section viewed from C-C arrows is a cross section parallel to the XZ plane that passes through the −Y direction side of the center of the holding portion 123A in the Y direction.

The antenna device of the 11th modification example includes a power feeding line 133K and the ground layer 132B that construct a microstrip line, instead of the patch antenna 130. The power feeding line 133K is an example of the power feeding unit. The antenna device of the 11th modification example includes the antenna element 140A instead of the second antenna element 140. The antenna element 140A is an example of a radiation element. The substrate 120 is an example of a dielectric substrate.

The antenna element 140A has the same configuration as that of the second antenna element 140 of the antenna device 100 of the embodiment, and is disposed at the same position as that of the second antenna element 140. For example, the antenna element 140A is disposed on the lower surface of the holding portion 123A of the substrate 120.

Since the antenna device of the 11th modification example of the embodiment does not include the patch antenna 130 including the first antenna elements 131, each antenna included in the antenna device of the 11th modification example of the embodiment is constructed by one antenna element 140A.

The ground layer 132B is provided over the surface of the substrate 110 on the −Z direction side, and the power feeding line 133K is provided over the surface of the substrate 110 on the +Z direction side. As an example, the power feeding line 133K extends from the end portion on the −Y direction side at the center in the X direction toward the center of the substrate 110 in plan view, over the surface of the substrate 110 on the +Z direction side. The end portion of the power feeding line 133K on the +Y direction side is positioned immediately below the outer edge of the antenna element 140A extending in the X direction on the −Y direction side in plan view, and is separated from the antenna element 140A in the Z direction.

By feeding power using such power feeding line 133K, the antenna element 140A may be excited in the Y direction, and a vertically polarized radio wave may be radiated.

The antenna device of the 11th modification example of the embodiment has a configuration in which each antenna includes one antenna element 140A. Since the through holes 124 are provided around the antenna element 140A in plan view, the effective relative permittivity of the constituent elements around the antenna element 140A may be reduced. For this reason, mutual coupling between antennas constructed by the antenna element 140A may be reduced, and a gain of the antenna device may be increased. As described above, in the antenna device of the 11th modification example, since the through holes 124 are provided around the antenna element 140A in plan view, an electric field leaking in the +Z direction increases and electric fields leaking in the X direction and the Y direction are reduced, thereby reducing mutual coupling between adjacent antennas and increasing a gain.

Another power feeding line that extends from the end portion on the −X direction side or the +X direction side at the center in the Y direction toward the center of the substrate 110 in plan view may be provided over the surface of the substrate 110 on the +Z direction side, and the antenna element 140A may be excited in the X direction and a horizontally polarized radio wave may be radiated. Such power feeding line may be provided instead of the power feeding line 133K or may be provided in addition to the power feeding line 133K.

12th Modification Example

Figure 15A:
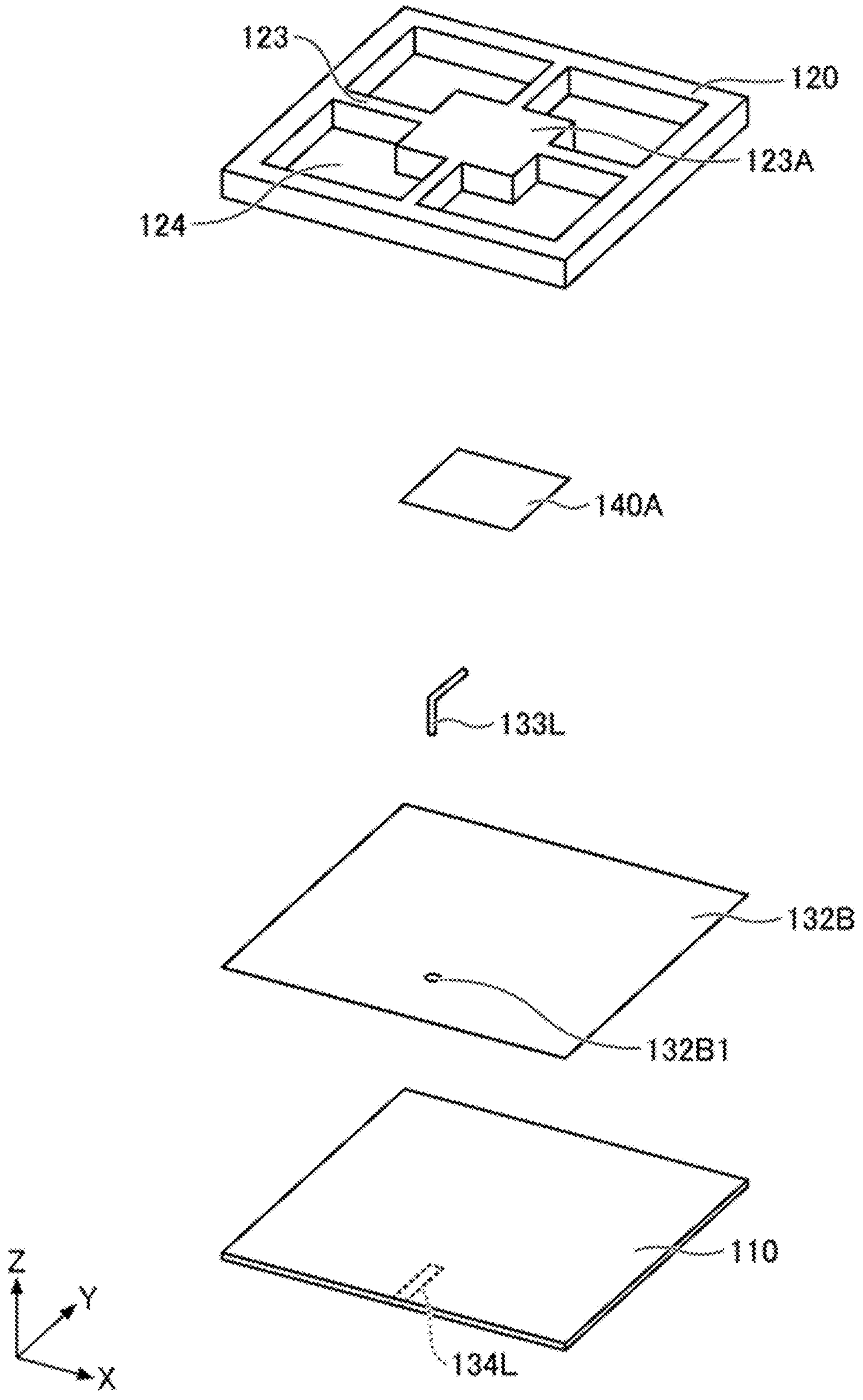
FIG. 15A is a diagram illustrating an example of a configuration of an antenna included in an antenna device of a 12th modification example of the embodiment.
Figure 15B:
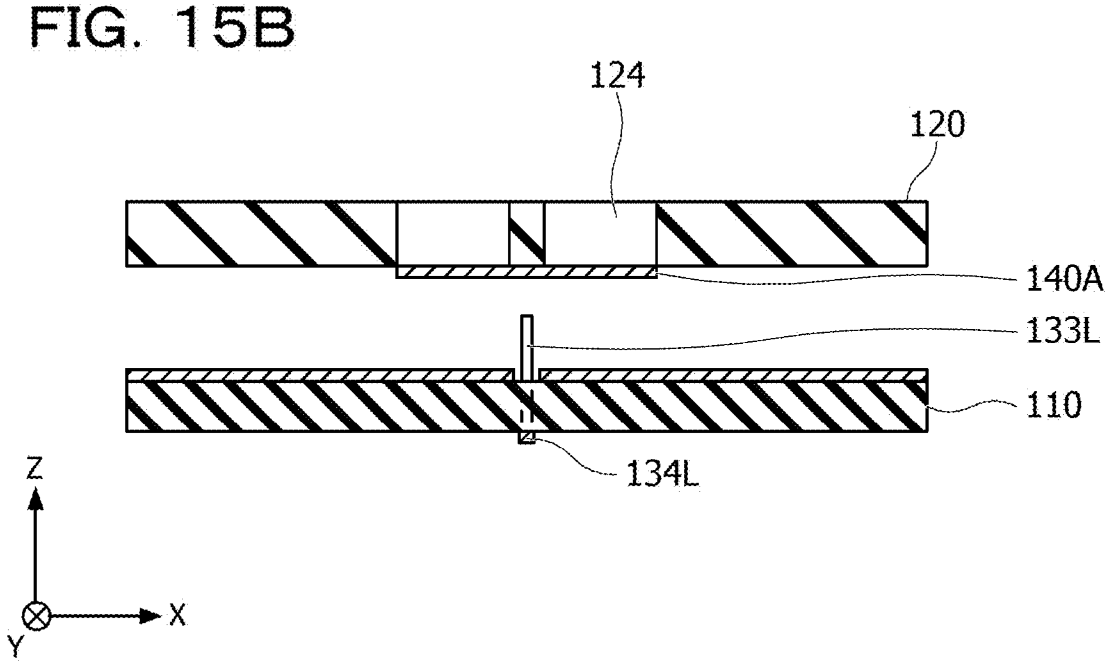
FIG. 15B is a diagram illustrating an example of a configuration of an antenna included in the antenna device of the 12th modification example of the embodiment.
Figure 15C:
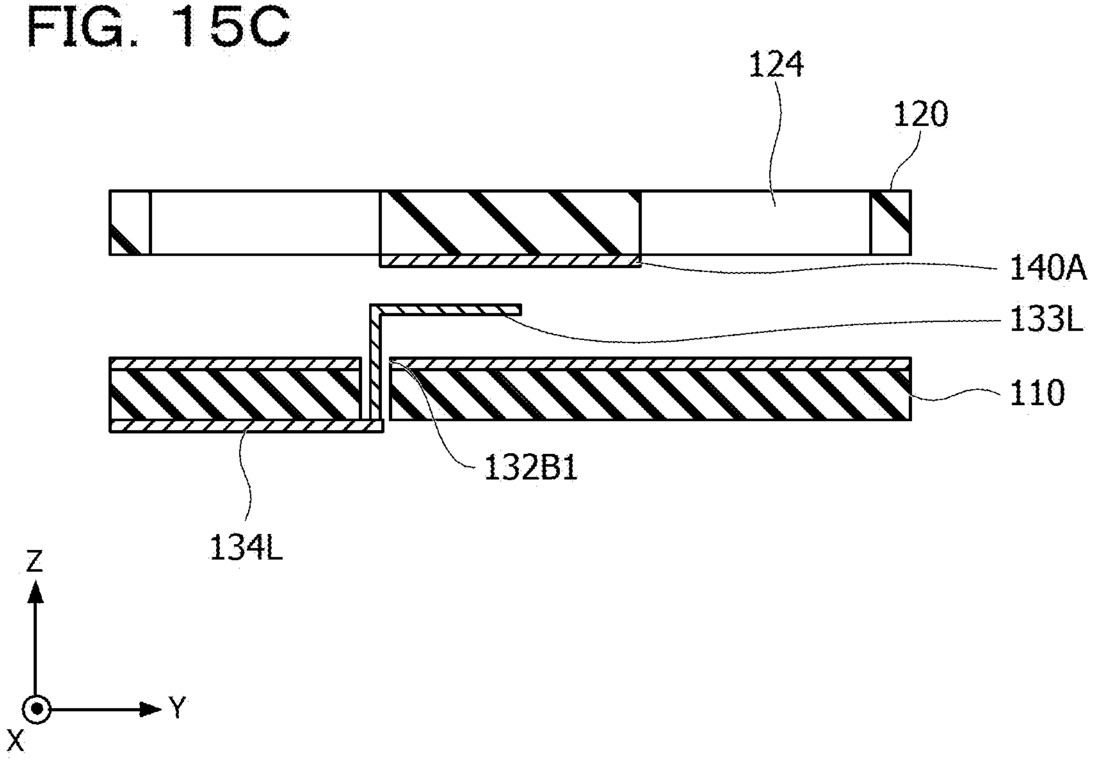
FIG. 15C is a diagram illustrating an example of a configuration of an antenna included in the antenna device of the 12th modification example of the embodiment.

FIG. 15A to FIG. 15C are diagrams illustrating an example of a configuration of an antenna included in an antenna device of the 12th modification example of the embodiment.

FIG. 15A to FIG. 15C are diagrams illustrating an example of a configuration of a portion corresponding to one antenna of a plurality of antennas included in the antenna device of the 12th modification example. FIG. 15A is an exploded view, and FIG. 15B and FIG. 15C are sectional views. The cross section illustrated in FIG. 15B is a cross section of the antenna corresponding to the cross section parallel to the XZ plane that passes through a through hole 132B1 of the ground layer 132B in FIG. 15A. The through hole 132B1 is offset toward the −Y direction side from the center of the ground layer 132B in plan view. The cross section illustrated in FIG. 15C is a cross section of the antenna corresponding to the cross section parallel to the YZ plane that passes through the through hole 132B1 of the ground layer 132B.

The antenna device of the 12th modification example has a configuration in which the microstrip line of the antenna device of the 11th modification example is changed to an L-shaped probe 133L. The L-shaped probe 133L is an example of the power feeding unit. Since the antenna device of the 12th modification example of the embodiment does not include the patch antenna 130 including the first antenna elements 131, each antenna included in the antenna device of the 12th modification example of the embodiment is constructed by one antenna element 140A.

The ground layer 132B is provided over the surface of the substrate 110 on the +Z direction side, and includes the through hole 132B1 formed at a position offset from the center toward the −Y direction side. The substrate 110 includes a through hole that communicates with the through hole 132B1 and penetrates the substrate 110 in the Z direction. A portion of the L-shaped probe 133L parallel to the Z direction is inserted through the through hole 132B1 and the through hole of the substrate 110.

A portion of the L-shaped probe 133L parallel to the Y direction is bent perpendicularly to the +Y direction with respect to the portion parallel to the Z direction, and the tip is positioned immediately below the outer edge of the antenna element 140A extending in the X direction on the −Y direction side in plan view, and is separated from the antenna element 140A in the Z direction.

The end portion of the L-shaped probe 133L on the −Z direction side in a section parallel to the Z direction is coupled to a power feeding line 134L provided on the −Z direction side of the substrate 110. The power feeding line 134L and the ground layer 132B construct a microstrip line.

By feeding power using such L-shaped probe 133L, the antenna element 140A may be excited in the Y direction, and a vertically polarized radio wave may be radiated.

As with the antenna device of the 11th modification example, the antenna device of the 12th modification example of the embodiment may reduce mutual coupling between antennas constructed by the antenna element 140A, and may increase a gain of the antenna device.

An L-shaped probe for horizontal polarization may be provided instead of the L-shaped probe 133L or may be provided in addition to the L-shaped probe 133L.

13th Modification Example

Figure 16A:
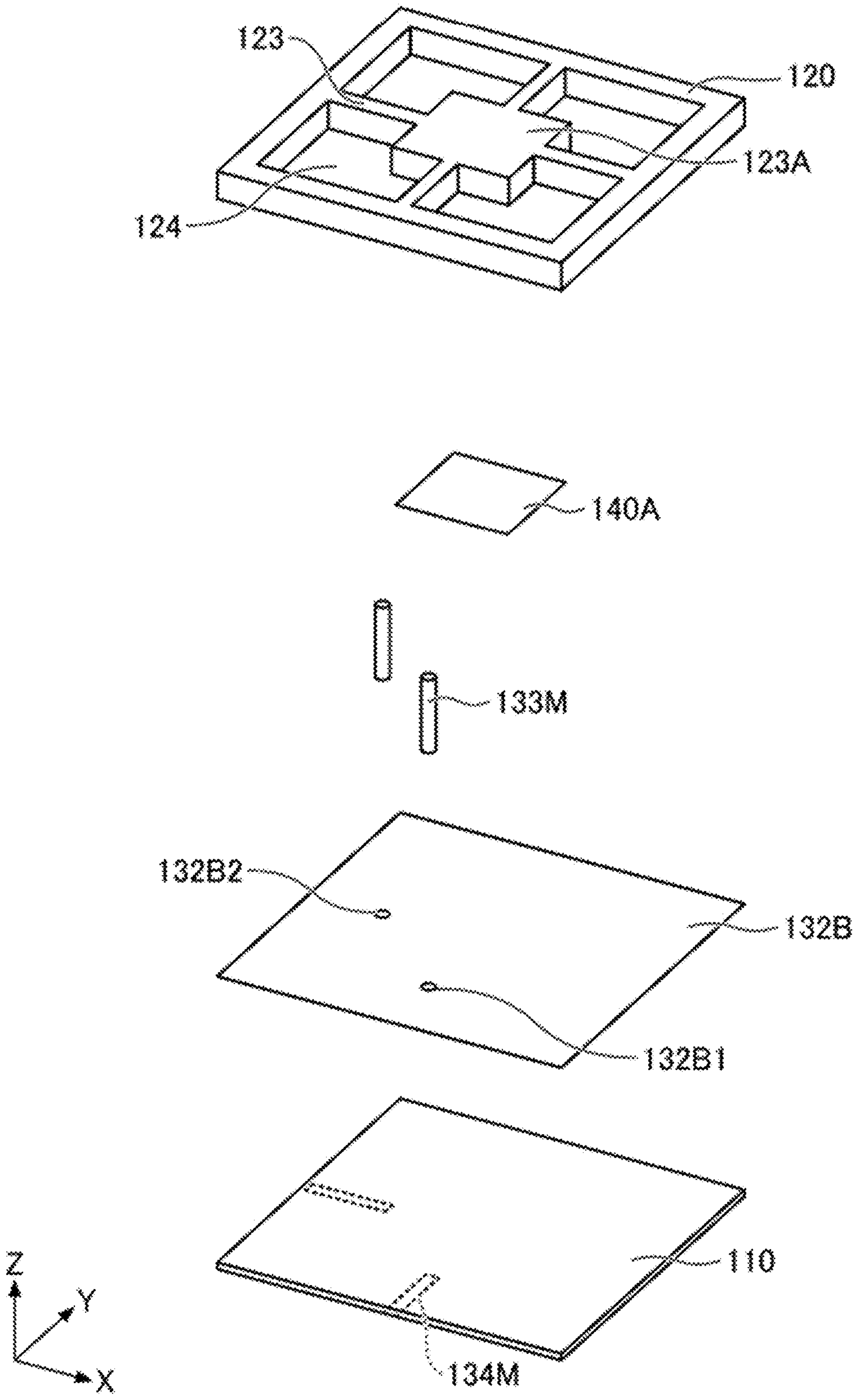
FIG. 16A is a diagram illustrating an example of a configuration of an antenna included in an antenna device of a 13th modification example of the embodiment.
Figure 16B:
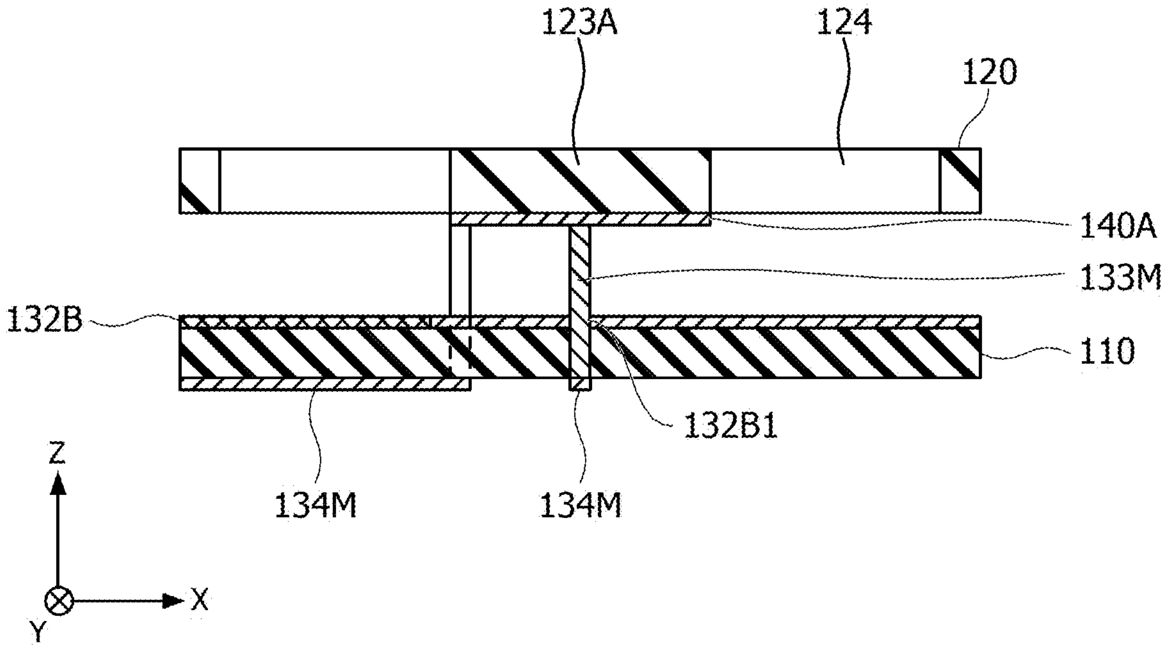
FIG. 16B is a diagram illustrating an example of a configuration of an antenna included in the antenna device of the 13th modification example of the embodiment.

FIG. 16A and FIG. 16B are diagrams illustrating an example of a configuration of an antenna included in an antenna device of the 13th modification example of the embodiment.

FIG. 16A and FIG. 16B are diagrams illustrating an example of a configuration of a portion corresponding to one antenna of a plurality of antennas included in the antenna device of the 13th modification example. FIG. 16A is an exploded view, and FIG. 16B is a sectional view. The cross section illustrated in FIG. 16B is a cross section of the antenna corresponding to the cross section parallel to the XZ plane that passes through the through hole 132B1 for vertical polarization of the ground layer 132B in FIG. 16A. The through hole 132B1 for vertical polarization is offset toward the −Y direction side from the center of the ground layer 132B in plan view. A through hole 132B2 for horizontal polarization is offset toward the −X direction side from the center of the ground layer 132B in plan view.

The antenna device of the 13th modification example has a configuration in which the L-shaped probe 133L of the antenna device of the 12th modification example is changed to a probe 133M. The probe 133M is an example of the power feeding unit. Since the antenna device of the 13th modification example of the embodiment does not include the patch antenna 130 including the first antenna elements 131, each antenna included in the antenna device of the 13th modification example of the embodiment is constructed by one antenna element 140A.

The ground layer 132B is provided over the surface of the substrate 110 on the +Z direction side, and includes the through hole 132B1 for vertical polarization formed at a position offset from the center toward the −Y direction side and the through hole 132B2 for horizontal polarization formed at a position offset from the center toward the −X direction side. The substrate 110 includes two through holes that communicate with the through holes 132B1 and 132B2 and penetrate the substrate 110 in the Z direction. Two probes 133M are inserted through the through holes 132B1 and 132B2 and the two through holes of the substrate 110.

The tip of the probe 133M for vertical polarization is coupled to the surface of the antenna element 140A on the −Z direction side in the vicinity of the outer edge of the antenna element 140A extending in the X direction on the −Y direction side in plan view. The tip of the probe 133M for horizontal polarization is coupled to the surface of the antenna element 140A on the −Z direction side in the vicinity of the outer edge of the antenna element 140A extending in the Y direction on the −X direction side in plan view.

The end portions of the two probes 133M on the −Z direction side are coupled to two power feeding lines 134M provided on the −Z direction side of the substrate 110. Each power feeding line 134M and the ground layer 132B construct a microstrip line.

By feeding power using such probe 133M, the antenna element 140A may be excited in the Y direction and the X direction, and vertically polarized and horizontally polarized radio waves may be radiated.

As with the antenna device of the 11th modification example, the antenna device of the 13th modification example of the embodiment may reduce mutual coupling between antennas constructed by the antenna element 140A, and may increase a gain of the antenna device.

In the 13th modification example, the substrate 110 may be a metallic substrate. In this case, the ground layer 132B does not have to be used, and a connector or the like may be used instead of using the power feeding line 134M.

14th Modification Example

Figure 17A:
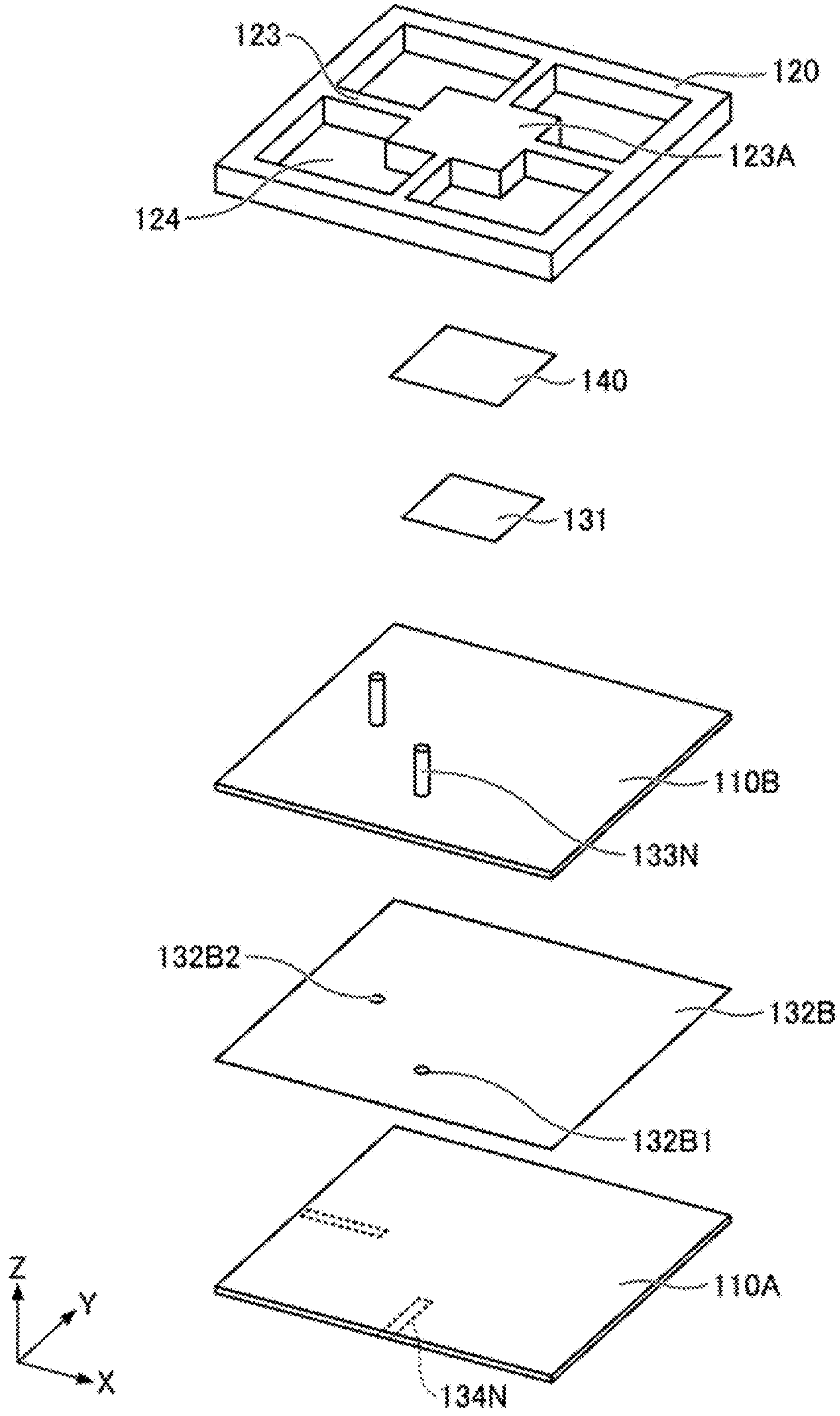
FIG. 17A is a diagram illustrating an example of a configuration of an antenna included in an antenna device of a 14th modification example of the embodiment.
Figure 17B:
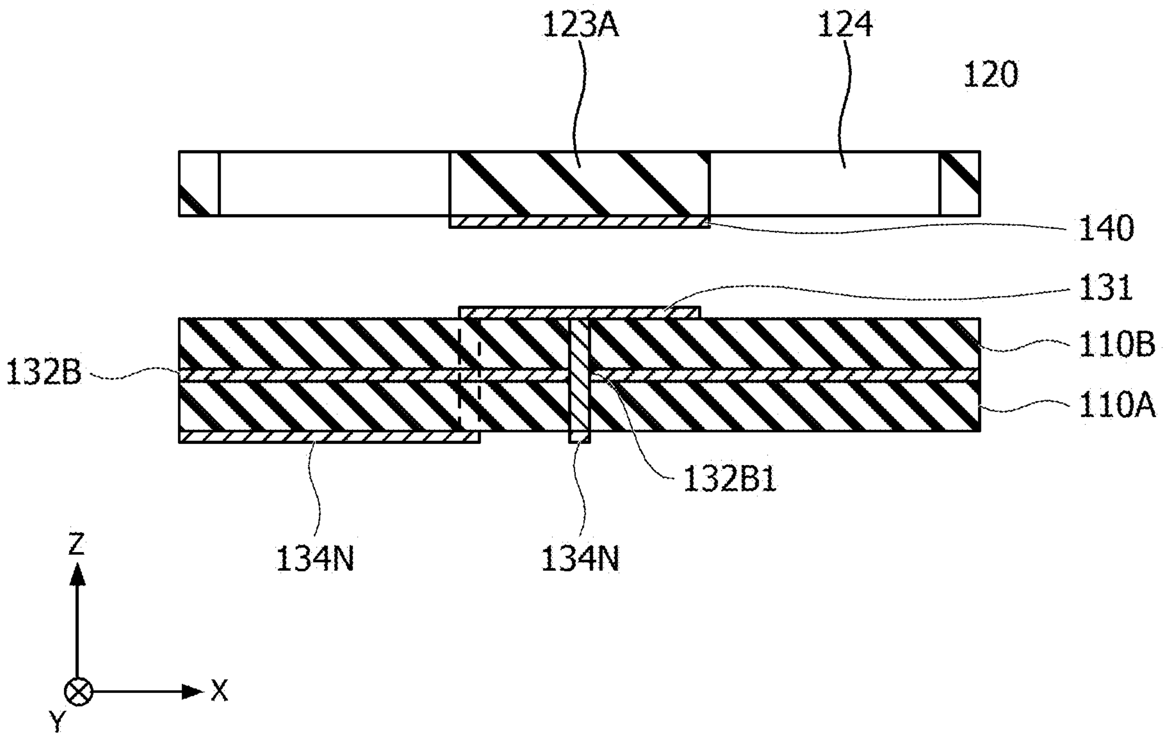
FIG. 17B is a diagram illustrating an example of a configuration of an antenna included in the antenna device of the 14th modification example of the embodiment.

FIG. 17A and FIG. 17B are diagrams illustrating an example of a configuration of an antenna included in an antenna device of the 14th modification example of the embodiment.

FIG. 17A and FIG. 17B are diagrams illustrating an example of a configuration of a portion corresponding to one antenna of a plurality of antennas included in the antenna device of the 14th modification example. FIG. 17A is an exploded view, and FIG. 17B is a sectional view. The cross section illustrated in FIG. 17B is a cross section of the antenna corresponding to the cross section parallel to the XZ plane that passes through the through hole 132B1 for vertical polarization of the ground layer 132B in FIG. 17A. The through hole 132B1 for vertical polarization is offset toward the −Y direction side from the center of the ground layer 132B in plan view. The through hole 132B2 for horizontal polarization is offset toward the −X direction side from the center of the ground layer 132B in plan view.

The antenna device of the 14th modification example has a configuration in which the substrate 110 of the antenna device 100 of the embodiment is changed to the two layers of substrates 110A and 110B, and two probes 133N are used instead of the vias 135H and 135V for feeding power to the first antenna element 131. The first antenna element 131 is provided over the surface of the substrate 110B on the +Z direction side. In the antenna device of the 14th modification example, the first antenna element 131 and the second antenna element 140 construct an antenna.

The ground layer 132B is provided between the substrates 110A and 110B (as an inner layer), and includes the through hole 132B1 for vertical polarization formed at a position offset from the center toward the −Y direction side and the through hole 132B2 for horizontal polarization formed at a position offset from the center toward the −X direction side. The substrates 110A and 110B include two through holes that communicate with the through holes 132B1 and 132B2 and penetrate the substrates 110A and 110B in the Z direction. The two probes 133N are inserted through the through holes 132B1 and 132B2 and the two through holes of the substrates 110A and 110B.

The tip of the probe 133N for vertical polarization is coupled to the surface of the first antenna element 131 on the −Z direction side in the vicinity of the outer edge of the first antenna element 131 extending in the X direction on the −Y direction side in plan view. The tip of the probe 133N for horizontal polarization is coupled to the surface of the first antenna element 131 on the −Z direction side in the vicinity of the outer edge of the first antenna element 131 extending in the Y direction on the −X direction side in plan view.

The end portions of the two probes 133N on the −Z direction side are coupled to two power feeding lines 134N provided on the −Z direction side of the substrate 110A. Each power feeding line 134N and the ground layer 132B construct a microstrip line.

By feeding power using such probe 133N, the first antenna element 131 may be excited in the Y direction and the X direction, and vertically polarized and horizontally polarized radio waves may be radiated. Since the second antenna element 140 is disposed on the +Z direction side of the first antenna element 131 by being separated from the first antenna element 131 and is electromagnetically coupled to the first antenna element 131, when the first antenna element 131 is excited, the second antenna element 140 is excited by the first antenna element 131. For this reason, the second antenna element 140 also radiates vertically polarized and horizontally polarized radio waves. By making the sizes of the first antenna element 131 and the second antenna element 140 different from each other, a wider bandwidth may be achieved.

As with the antenna device 100 of the embodiment, the antenna device of the 14th modification example of the embodiment may reduce the mutual coupling between antennas constructed by the first antenna element 131 and the second antenna element 140, and may increase a gain of the antenna device.

The second antenna element 140 may be provided over the surface of the substrate 120 on the +Z direction side.

The antenna device of the exemplary embodiment of the present disclosure has been described above, but the present disclosure is not limited to the specifically disclosed embodiment, and various modifications and variations may be made without departing from the scope of the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An antenna device comprising:
- a first dielectric substrate that includes a first surface;
- a second dielectric substrate that faces the first dielectric substrate;
- a plurality of first radiation elements that is provided over the first surface;
- a power feeding unit that feeds power to the first radiation elements; and
- a plurality of second radiation elements that is provided over a second surface of the second dielectric substrate and coupled to the plurality of first radiation elements;
- the plurality of first radiation elements is a plurality of antenna elements for a patch antenna,
- the second dielectric substrate
  - includes a plurality of through holes that are formed around the plurality of second radiation elements of the second dielectric substrate in plan view, and
  - includes a plurality of beam portions that extends between the plurality of through holes in plan view and holds the plurality of second radiation elements,
- the plurality of second radiation elements is arranged along a first axial direction and a second axial direction in plan view,
- the plurality of beam portions extends along the first axial direction or the second axial direction in plan view,
- the first axial direction or the second axial direction is a direction perpendicular to an excitation direction of an electric field of the plurality of second radiation elements in plan view, and
- the plurality of beam portions extends over a straight line that couples centers of the plurality of second radiation elements in the first axial direction or the second axial direction in plan view.

2. The antenna device according to claim 1, wherein the power feeding unit is a slot power feeding unit that feeds power away from the first radiation elements, a power feeding line that feeds power away from the first radiation elements, an L-shaped probe that feeds power away from the first radiation elements, or a probe that is coupled to the first radiation elements and feeds power.

3. The antenna device according to claim 1, wherein the plurality of second radiation elements is disposed respectively at positions that overlap the plurality of antenna elements in plan view.

4. The antenna device according to claim 3, wherein a shape of the plurality of second radiation elements in plan view is equal to a shape of the plurality of antenna elements in plan view.

5. The antenna device according to claim 1, wherein the through holes are a plurality of through holes formed, for each of the plurality of second radiation elements, so as to surround the second radiation elements in plan view.

6. The antenna device according to claim 1, wherein a dielectric member is further included that is provided between the first dielectric substrate and the second dielectric substrate or inside the through holes, and has a relative permittivity lower than relative permittivities of the first dielectric substrate and the second dielectric substrate.

7. The antenna device according to claim 1, wherein
- the beam portions include a plurality of holding portions wider than other portions of the beam portions, and the plurality of second radiation elements is held respectively by the plurality of holding portions.

8. The antenna device according to claim 1, wherein the plurality of second radiation elements is arranged along a first axial direction and a second axial direction in plan view, and the plurality of beam portions extends along directions at an angle to the first axial direction and the second axial direction in plan view.

9. The antenna device according to claim 1, wherein the second dielectric substrate includes a frame portion provided along an outer edge of the second dielectric substrate in plan view and coupled to end portions of the plurality of beam portions on the outer edge side.

10. An antenna device comprising:

a dielectric substrate;

a plurality of radiation elements that is provided over a surface of the dielectric substrate; and a power feeding unit that feeds power to the radiation elements, the dielectric substrate includes a plurality of through holes that are formed around the plurality of radiation elements of the dielectric substrate in plan view, and includes a plurality of beam portions that extends between the plurality of through holes in plan view and holds the plurality of radiation elements, the plurality of radiation elements is arranged along a first axial direction and a second axial direction in plan view, the plurality of beam portions extends along the first axial direction or the second axial direction in plan view, the first axial direction or the second axial direction is a direction perpendicular to an excitation direction of an electric field of the plurality of radiation elements in plan view, and the plurality of beam portions extends over a straight line that couples centers of the plurality of radiation elements in the first axial direction or the second axial direction in plan view.

11. The antenna device according to claim 10, wherein the power feeding unit is a slot power feeding unit that feeds power away from the radiation elements, a power feeding line that feeds power away from the radiation elements, an L-shaped probe that feeds power away from the radiation elements, or a probe that is coupled to the radiation elements and feeds power.

12. The antenna device according to claim 10, wherein the beam portions include a plurality of holding portions wider than other portions of the beam portions, and the plurality of radiation elements is held respectively by the plurality of holding portions.

* * * * *